(12) United States Patent
Morizur et al.

(10) Patent No.: US 9,580,595 B2
(45) Date of Patent: Feb. 28, 2017

(54) COMPOSITIONS AND ARTICLES OF MANUFACTURE CONTAINING BRANCHED POLYCARBONATE

(71) Applicant: SABIC Global Technologies B.V., Bergen op Zoom (NL)

(72) Inventors: Jean-Francois Morizur, Evansville, IN (US); Peter Hendrikus Theodorus Vollenberg, Eindhoven (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 12 days.

(21) Appl. No.: 13/896,071

(22) Filed: May 16, 2013

(65) Prior Publication Data

US 2013/0310498 A1 Nov. 21, 2013

Related U.S. Application Data

(60) Provisional application No. 61/648,053, filed on May 16, 2012.

(51) Int. Cl.
*C08L 69/00* (2006.01)

(52) U.S. Cl.
CPC ..................... *C08L 69/00* (2013.01)

(58) Field of Classification Search
CPC .................. C08L 69/00; C08K 5/42
USPC ........................................ 524/165
See application file for complete search history.

(56) References Cited

U.S. PATENT DOCUMENTS

| | | | |
|---|---|---|---|
| 4,128,689 A | 12/1978 | Heaps et al. | |
| 4,766,255 A | 8/1988 | Ong et al. | |
| 5,357,028 A | 10/1994 | Pakull et al. | |
| 7,267,922 B2 | 9/2007 | Choi | |
| 7,351,757 B2 | 4/2008 | Ohira et al. | |
| 7,408,016 B2 | 8/2008 | Chatterjee et al. | |
| 7,470,796 B2 | 12/2008 | Rai et al. | |
| 7,473,513 B1 | 1/2009 | Park et al. | |
| 7,528,214 B2 | 5/2009 | Chatterjee et al. | |
| 7,638,091 B2 | 12/2009 | Chatterjee et al. | |
| 7,649,073 B2 | 1/2010 | Davis et al. | |
| 7,652,083 B2 | 1/2010 | Mullen | |
| 7,674,872 B2 | 3/2010 | Brack et al. | |
| 7,696,297 B2 | 4/2010 | Schultz et al. | |
| 7,790,832 B2 | 9/2010 | Ganesan et al. | |
| 7,816,444 B2 | 10/2010 | Kamps et al. | |
| 7,842,379 B2 | 11/2010 | Thiagarajan et al. | |
| 7,848,025 B2 | 12/2010 | Hatano et al. | |
| 7,863,403 B2 | 1/2011 | Heuer et al. | |
| 7,884,220 B2 | 2/2011 | Xu et al. | |
| 7,923,110 B2 | 4/2011 | Park et al. | |
| 7,935,777 B2 | 5/2011 | de Kraker et al. | |
| 8,022,166 B2 | 9/2011 | de Kraker et al. | |
| 8,064,140 B2 | 11/2011 | Hoeks et al. | |
| 8,084,134 B2 | 12/2011 | Malinoski et al. | |
| 8,106,126 B2 | 1/2012 | Vaze et al. | |
| 8,106,144 B2 | 1/2012 | Ooms et al. | |
| 8,461,249 B2 | 6/2013 | Morizur et al. | |
| 9,315,666 B2 | 4/2016 | Morizur et al. | |
| 2005/0054532 A1 | 3/2005 | Kocur et al. | |
| 2005/0143554 A1 | 6/2005 | Dhara et al. | |
| 2005/0228137 A1* | 10/2005 | Srinivasan | C07D 209/46 525/186 |
| 2006/0004152 A1 | 1/2006 | Acar et al. | |
| 2007/0010619 A1* | 1/2007 | Chatterjee | C08G 64/12 525/67 |
| 2007/0100119 A1 | 5/2007 | Shyamroy et al. | |
| 2007/0123686 A1 | 5/2007 | Mahood et al. | |
| 2007/0123712 A1 | 5/2007 | Ganesan et al. | |
| 2007/0123714 A1 | 5/2007 | Ganesan et al. | |
| 2007/0205706 A1 | 9/2007 | Yamada et al. | |
| 2008/0003363 A1 | 1/2008 | Park et al. | |
| 2008/0081860 A1 | 4/2008 | Li et al. | |
| 2008/0161507 A1 | 7/2008 | Chakravarti et al. | |
| 2008/0220250 A1 | 9/2008 | Ortmeier et al. | |
| 2008/0223255 A1 | 9/2008 | Gonzalez et al. | |

(Continued)

FOREIGN PATENT DOCUMENTS

| | | |
|---|---|---|
| EP | 0000146 B1 | 4/1982 |
| EP | 1803655 B1 | 12/2005 |
| GB | 902825 | 8/1962 |
| GB | 2309457 A | 7/1997 |
| WO | 2008060714 A2 | 5/2008 |
| WO | 2008157328 A1 | 12/2008 |
| WO | 2011094303 A3 | 8/2011 |
| WO | 2012065039 A1 | 5/2012 |

OTHER PUBLICATIONS

Chinese Patent No. 101370330 (A); Publication Date: Feb. 18, 2009; Abstract Only; 1 Page.
European Patent No. 1803655 (B1); Publication Date: Mar. 19, 2008; Abstract Only; 2 Pages.
Japanese Patent No. 2010048342 (A), Publication Date: Mar. 4, 2010, Abstract Only, 2 Pages.
Japanese Patent No. 5247197 (A); Publication Date: Sep. 24, 1993; Abstract Only; 1 Page.

(Continued)

*Primary Examiner* — John Uselding
(74) *Attorney, Agent, or Firm* — Cantor Colburn LLP

(57) ABSTRACT

Disclosed herein is a composition comprising: a flame retardant comprising a sulfonate salt and three polycarbonates. The first polycarbonate has a branching level of greater than or equal to 2%, a weight average molecular weight of 20,000 g/mole to 55,000 g/mole and a peak melt viscosity of greater than or equal to 25,000 poise. The second polycarbonate has a glass transition temperature greater than or equal to 170° C. The third polycarbonate has a branching level of 0 to less than 2% and a molecular weight of 17,000 to 40,000 g/mol. The composition has a heat distortion temperature greater than or equal to 145° C., ductility greater than or equal to 90% at 23° C., multi-axial impact greater than or equal to 50 Joules per meter (J/m) at 23° C., and a molded article of the composition has a UL 94 V0 rating at a thickness of 1.5 mm.

25 Claims, No Drawings

(56) References Cited

U.S. PATENT DOCUMENTS

| | | |
|---|---|---|
| 2008/0242829 A1 | 10/2008 | Basale et al. |
| 2008/0242873 A1 | 10/2008 | Basale et al. |
| 2008/0274360 A1 | 11/2008 | Gallucci |
| 2009/0030128 A1 | 1/2009 | Chakravarti et al. |
| 2009/0030129 A1 | 1/2009 | Chakravarti et al. |
| 2009/0036633 A1 | 2/2009 | Scindia et al. |
| 2009/0088504 A1 | 4/2009 | Chatterjee et al. |
| 2009/0326183 A1 | 12/2009 | Schultz et al. |
| 2010/0081828 A1 | 4/2010 | Bhotla et al. |
| 2010/0081829 A1 | 4/2010 | Bhotla et al. |
| 2010/0081831 A1 | 4/2010 | Bhotla et al. |
| 2010/0152416 A1 | 6/2010 | Bhotla et al. |
| 2010/0168311 A1 | 7/2010 | Jansen et al. |
| 2010/0280159 A1 | 11/2010 | Maas et al. |
| 2011/0151262 A1 | 6/2011 | Heuer et al. |
| 2012/0034513 A1 | 2/2012 | Kim |
| 2013/0017473 A1 | 1/2013 | Kim et al. |
| 2016/0177090 A1 | 6/2016 | Morizur et al. |

OTHER PUBLICATIONS

Mendelson, R.A.; Tough Thermoplastic Materials Derived from Blends Containing Polynorborene Nitrile; Research Disclosure Database No. 224016; Dec. 1982, 3 Pages.

International Search Report for International Application No. PCT/US2013/041407, International Application Filing Date: May 16, 2013; Date of Mailing Jul. 29, 2013; 4 pages.

Written Opinion for International Application No. PCT/US2013/041407, International Application Filing Date: May 16, 2013; Date of Mailing Jul. 29, 2013; 5 pages.

\* cited by examiner

US 9,580,595 B2

COMPOSITIONS AND ARTICLES OF MANUFACTURE CONTAINING BRANCHED POLYCARBONATE

CROSS REFERENCED TO RELATED APPLICATION

This application claims the benefit of U.S. Provisional Patent Application No. 61/648,053 filed on May 16, 2012, which is incorporated by reference herein in its entirety.

BACKGROUND

Polycarbonate is a high-performance plastic with good impact strength (ductility). However, polycarbonate often has relatively limited flow properties, which is needed in the manufacture of thin walled articles. Medium to high flow polycarbonate grades suffer from the fact that the ductility is sacrificed for a better flow. Furthermore, it becomes difficult to combine adequate ductility with a high glass transition temperature, impact strength and flame retardance (particularly at thicknesses of 1.5 millimeters or less).

There accordingly remains a need in the art for high flow polycarbonate compositions and articles made therefrom that combine adequate ductility with a high glass transition temperature, impact strength and flame retardance.

SUMMARY

Disclosed herein is a composition comprising: a flame retardant comprising a sulfonate salt; a first polycarbonate, wherein the first polycarbonate comprises structural units of formula (I)

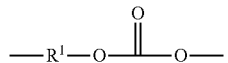

wherein greater than or equal to 60 percent of the total number of $R^1$ groups comprise aromatic groups and the balance thereof are aliphatic or alicyclic groups, terminal groups derived from an end-capping agent, and wherein the first polycarbonate has a branching level of greater than or equal to 2%, a weight average molecular weight of 20,000 g/mole to 55,000 g/mole as measured by gel permeation chromatography using polycarbonate standards and a peak melt viscosity of greater than or equal to 25,000 poise when measured using a parallel plate melt rheology test at a heating rate of 10° C./min at a temperature of 350° C. to 450° C. at a frequency of 3 radians/second and a strain amplitude of 9%; a second polycarbonate having a glass transition temperature greater than or equal to 170° C., wherein the second polycarbonate comprises structural units derived from HO-$A^1$-$Y^1$-$A^2$-OH and structural units derived from HO-$A^1$-$Y^2$-$A^2$-OH wherein each of $A^1$ and $A^2$ is a monocyclic divalent aryl group, $Y^1$ is an aliphatic bridging group or bridging group comprising one to three atoms with the proviso that greater than or equal to one of the atoms is a hetero atom, and $Y^2$ is an aromatic group having 6 to 30 carbon atoms; and a third polycarbonate comprising structural units derived from bisphenol A and having a branching level of 0 to less than 2% and a molecular weight of 17,000 to 40,000 as measured by gel permeation chromatography using polycarbonate standards wherein the composition has a heat distortion temperature greater than or equal to 145° C., ductility greater than or equal to 90% at 23° C., multi-axial impact greater than or equal to 50 Joules per meter (J/m) at 23° C., and a molded article of the composition has a UL 94 V0 rating at a thickness of 1.5 mm.

In some embodiments the composition comprises potassium perfluorobutane sulfonate; 15 to 50 weight percent of a first polycarbonate, wherein the first polycarbonate comprises structural units of formula (I)

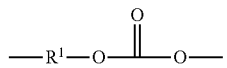

wherein greater than or equal to 60 percent of the total number of $R^1$ groups comprise aromatic groups and the balance thereof are aliphatic or alicyclic groups, terminal groups derived from an end-capping agent, and wherein the first polycarbonate has a branching level of greater than or equal to 2%, a weight average molecular weight of 20,000 g/mole to 55,000 g/mole as measured by gel permeation chromatography using polycarbonate standards and a peak melt viscosity of greater than or equal to 25,000 poise when measured using a parallel plate melt rheology test at a heating rate of 10° C./min at a temperature of 350° C. to 450° C. at a frequency of 3 radians/second and a strain amplitude of 9%; 20 to 50 weight percent of a second polycarbonate having a glass transition temperature greater than or equal to 170° C., wherein the second polycarbonate comprises structural units derived from HO-$A^1$-$Y^1$-$A^2$-OH and structural units derived from HO-$A^1$-$Y^2$-$A^2$-OH wherein each of $A^1$ and $A^2$ is a monocyclic divalent aryl group, $Y^1$ is an aliphatic bridging group or bridging group comprising one to three atoms with the proviso that greater than or equal to one of the atoms is a hetero atom, and $Y^2$ is an aromatic group having 6 to 30 carbon atoms, and 15 to 50 weight percent of a third polycarbonate comprising structural units derived from bisphenol A and having a branching level of 0 to less than 2% and a molecular weight of 17,000 to 40,000 as measured by gel permeation chromatography using polycarbonate standards wherein weight percent is based on the combined weight of the first, second and third polycarbonates and the composition has a heat distortion temperature greater than or equal to 145° C., ductility greater than or equal to 90% at 23° C., multi-axial impact greater than or equal to 50 Joules per meter (J/m) at 23° C. ° C., and a molded article of the composition has a UL 94 V0 rating at a thickness of 1.0 mm.

In some embodiments the composition comprises potassium sulfone sulfonate; 15 to 50 weight percent of a first polycarbonate, wherein the first polycarbonate comprises structural units of formula (I)

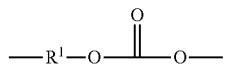

wherein greater than or equal to 60 percent of the total number of $R^1$ groups comprise aromatic groups and the balance thereof are aliphatic, alicyclic, or aromatic groups, terminal groups derived from an end-capping agent, and structural units derived from a branching agent; 20 to 50 weight percent of a second polycarbonate having a glass transition temperature greater than or equal to 170° C., wherein the second polycarbonate comprises structural units derived from HO-$A^1$-$Y^1$-$A^2$-OH and structural units derived from HO-$A^1$-$Y^2$-$A^2$-OH wherein each of $A^1$ and $A^2$ is a monocyclic divalent aryl group, $Y^1$ is an aliphatic bridging group or bridging group comprising one to three atoms with the proviso that greater than or equal to one of the atoms is a hetero atom, and $Y^2$ is an aromatic group having 6 to 30 carbon atoms, and 15 to 50 weight percent of a third polycarbonate third polycarbonate comprising structural units derived from bisphenol A and having a branching level of 0 to less than 2% and a molecular weight of 17,000 to 40,000 as measured by gel permeation chromatography using polycarbonate standards wherein weight percent is based on the combined weight of the first, second and third polycarbonates and the composition has a heat distortion temperature greater than or equal to 145° C., ductility greater than or equal to 90% at 23° C., multi-axial impact greater than or equal to 50 Joules per meter (J/m) at 23° C., and a molded article of the composition has a UL 94 V0 rating at a thickness of 1.2 mm.

DETAILED DESCRIPTION

As stated above, disclosed herein is a composition comprising a flame retardant comprising a sulfonate salt and three polycarbonates. The first polycarbonate is branched and end-capped. The second polycarbonate has a high glass transition temperature. The third polycarbonate improves the ductility of the composition with little or no negative impact on the other physical properties. The combination of these four components yields a composition having a combination of high melt flow, ductility, glass transition temperature, impact strength and surprisingly good flame retardance at low thickness. This is highly surprising since good flame retardance is generally harder to achieve at low thickness and when the composition has a high melt flow the expectation is that the flame retardance is even harder to achieve due to an increased propensity to form flaming drips.

A. First Polycarbonate

The first polycarbonate comprises structural units of formula (1):

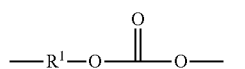

(1)

wherein greater than or equal to 60 percent of the total number of $R^1$ groups contains aromatic groups and the balance thereof are aliphatic or alicyclic groups. In one embodiment, the polycarbonate is derived from bisphenol A. In one embodiment, each $R^1$ group is a divalent aromatic group, for example derived from an aromatic dihydroxy compound of the formula (2):

HO—$R^1$—OH     (2).

In another embodiment, each $R^1$ group is a divalent aromatic group, for example derived from an aromatic dihydroxy compound of the formula (3):

HO-$A^1$-$Y^3$-$A^2$-OH     (3)

wherein $A^1$ and $A^2$ are each independently a monocyclic divalent arylene group, and $Y^3$ is a single bond or a bridging group having one or two atoms that separate $A^1$ from $A^2$. In an exemplary embodiment, one atom separates $A^1$ from $A^2$. In another embodiment, when each of $A^1$ and $A^2$ is phenylene, $Y^3$ is para to each of the hydroxyl groups on the phenylenes. Illustrative non-limiting examples of groups of this type are —O—, —S—, —S(O)—, —S(O)$_2$—, —C(O)—, methylene, cyclohexyl-methylene, 2-[2-2-1]-bicycloheptylidene, ethylidene, isopropylidene, neopentylidene, cyclohexylidene, cyclopentadecylidene, cyclododecylidene, and adamantylidene. The bridging group $Y^3$ can be a hydrocarbon group or a saturated hydrocarbon group such as methylene, cyclohexylidene, or isopropylidene.

Included within the scope of formula (3) are bisphenol compounds of general formula (4):

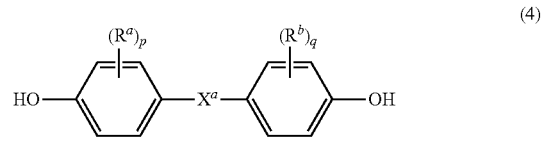

(4)

wherein $R^a$ and $R^b$ are each independently a hydrogen atom, a halogen atom, a $C_{1-12}$ alkyl group, or a monovalent hydrocarbon group and can be the same or different; p and q are each independently integers of 0 to 4; and $X^a$ represents a single bond, $C_{3-20}$ cycloalkylidene, or one of the groups of formulas (5) or (6):

(5)

(6)

wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, a cyclic $C_{7-12}$ heteroarylalkyl, or are taken together to represent a $C_{3-20}$ cyclic alkylene group or a heteroatom-containing $C_{3-20}$ cyclic alkylene group comprising carbon atoms and heteroatoms with a valency of two or greater, and $R^e$ is a divalent $C_{1-12}$ hydrocarbon group. In particular, $R^c$ and $R^d$ are each the same hydrogen or $C_{1-4}$ alkyl group, specifically the same $C_{1-3}$ alkyl group, even more specifically, methyl.

In an embodiment, $R^c$ and $R^d$ taken together to represent a $C_{3-20}$ cyclic alkylene group or a heteroatom-containing $C_{3-20}$ cyclic alkylene group comprising carbon atoms and heteroatoms with a valency of two or greater. These groups can be in the form of a single saturated or unsaturated ring, or a fused polycyclic ring system wherein the fused rings are saturated, unsaturated, or aromatic. A specific heteroatom-containing cyclic alkylene group comprises greater than or equal to one heteroatom with a valency of 2 or greater, and greater than or equal to two carbon atoms. Exemplary heteroatoms in the heteroatom-containing cyclic alkylene group include —O—, —S—, and —N(Z)—, where Z is a substituent group selected from hydrogen, hydroxy, $C_{1-12}$ alkyl, $C_{1-12}$ alkoxy, or $C_{1-12}$ acyl.

In a specific exemplary embodiment, $X^a$ is a substituted $C_{3-18}$ cycloalkylidene of the formula (7):

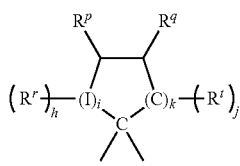

(7)

wherein $R^r$, $R^p$, $R^q$, and $R^t$ are each independently hydrogen, halogen, oxygen, or $C_{1-12}$ alkyl group, with the proviso that greater than or equal to two of $R^r$, $R^p$, $R^q$, and $R^t$ can be taken together to form a fused cycloaliphatic, aromatic, or heteroaromatic ring; I is a direct bond, a carbon, a divalent oxygen, sulfur, or —N(Z)— wherein Z is hydrogen, halogen, hydroxy, $C_{1-12}$ alkyl, $C_{1-12}$ alkoxy, or $C_{1-12}$ acyl; h is 0 to 2, j is 1 or 2, i is an integer of 0 or 1, and k is an integer of 0 to 3. It will be understood that where the fused ring is aromatic, the ring as shown in formula (7) will have an unsaturated carbon-carbon linkage where the ring is fused. When i is 0 and k is 1, the ring as shown in formula (7) contains 4 carbon atoms, when i is 0 and k is 2, the ring as shown contains 5 carbon atoms, and when i is 0 and k is 3, the ring contains 6 carbon atoms. In one embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group.

When k is 3 and i is 0, bisphenols containing substituted or unsubstituted cyclohexane units are used, for example bisphenols of formula (8):

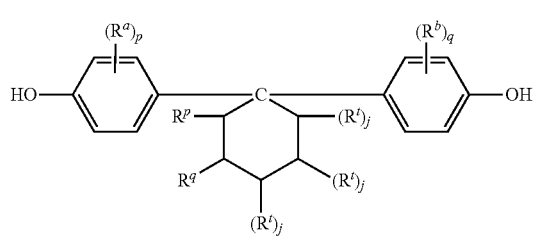

(8)

wherein $R^p$, $R^q$, and $R^t$ are each independently hydrogen, halogen, oxygen, or $C_{1-12}$ alkyl group, with the proviso that greater than or equal to two of $R^p$, $R^q$, and $R^t$ can be together to form a fused cycloaliphatic, aromatic, or heteroaromatic ring, $R^a$ and $R^b$ are each independently a hydrogen atom, a halogen atom, or a monovalent hydrocarbon group, p and q are each independently integers of 0 to 4, and j is 1 or 2. In an embodiment, $R^p$, $R^q$, and $R^t$ are each independently hydrogen, $C_{1-12}$ alkyl, or halogen; and each $R^a$ and $R^b$ is independently hydrogen or $C_{1-12}$ alkyl. When one or more of $R^p$, $R^q$, and $R^t$ is a $C_{1-12}$ alkyl, the $C_{1-12}$ alkyl can be aliphatic or aromatic, straight chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising greater than or equal to one of the foregoing with other bisphenol polycarbonates, are supplied by Bayer Co. under the APEC** trade name.

Other useful dihydroxy compounds having the formula (2):

$$HO—R^1—OH \quad (2)$$

include aromatic dihydroxy compounds of formula (9):

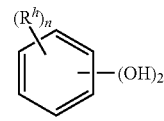

(9)

wherein $R^h$ is each independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some illustrative examples of dihydroxy compounds include the following: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl) propane, bis(4-hydroxyphenyl)phenylmethane, 2,2-bis(4-hydroxy-3-bromophenyl)propane, 1,1-bis(hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha,alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis (4-hydroxyphenyl)ether, bis(4-hydroxyphenyl)ether, bis(4-hydroxyphenyl)sulfide, bis(4-hydroxyphenyl)sulfoxide, bis (4-hydroxyphenyl)sulfone, 9,9 to bis(4-hydroxyphenyl) fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3, 5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising greater than or equal to one of the foregoing dihydroxy compounds.

Specific examples of bisphenol compounds that can be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl) n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising greater than or equal to one of the foregoing dihydroxy compounds can also be used.

"Polycarbonate" as used herein includes homopolycarbonates, copolymers comprising different $R^1$ moieties in the carbonate (referred to herein as "copolycarbonates"), and copolymers comprising carbonate units and other types of polymer units, such as ester units. In one specific embodiment, the polycarbonate is a linear homopolymer or copolymer comprising units derived from bisphenol A, in which each of $A^1$ and $A^2$ is p-phenylene and Y' is isopropylidene in formula (3). More specifically, in this embodiment, greater than or equal to 60%, particularly greater than or equal to 80% of the $R^1$ groups in the polycarbonate are derived from bisphenol A.

Another specific type of copolymer is a polyester carbonate, also known as a polyester-polycarbonate. Such copolymers further contain, in addition to recurring carbonate chain units of the formula (1), repeating units of formula (10):

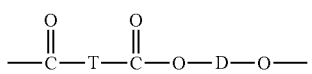

wherein D is a divalent group derived from a dihydroxy compound, and can be, for example, a $C_{2-10}$ alkylene group, a $C_{6-20}$ alicyclic group, a $C_{6-20}$ aromatic group or a polyoxyalkylene group in which the alkylene groups contain 2 to 6 carbon atoms, specifically 2, 3, or 4 carbon atoms; and T is a divalent group derived from a dicarboxylic acid, and can be, for example, a $C_{2-10}$ alkylene group, a $C_{6-20}$ alicyclic group, a $C_{6-20}$ alkyl aromatic group, a $C_{6-30}$ arylene group, or a $C_{6-20}$ aromatic group.

In one embodiment, D is a $C_{2-30}$ alkylene group having a straight chain, branched chain, or cyclic (including polycyclic) structure. In another embodiment, D is derived from an aromatic dihydroxy compound of formula (4) above. In another embodiment, D is derived from an aromatic dihydroxy compound of formula (9) above.

Examples of aromatic dicarboxylic acids that can be used to prepare the polyester units include isophthalic or terephthalic acid, 1,2-di-(p-carboxyphenyl)ethane, 4,4'-dicarboxydiphenyl ether, 4,4'-bisbenzoic acid, and combinations comprising greater than or equal to one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is 91:9 to 2:98. In another specific embodiment, D is a $C_{2-6}$ alkylene group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers can vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate can be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol A. In a specific embodiment, the polycarbonate units are derived from bisphenol A. In another specific embodiment, the polycarbonate units are derived from resorcinol and bisphenol A in a molar ratio of resorcinol carbonate units to bisphenol A carbonate units of 1:99 to 99:1.

A specific example of a polycarbonate-polyester is a copolycarbonate-polyester-polysiloxane terpolymer comprising carbonate units of formula (1), ester units of formula (10), and polysiloxane (also referred to herein as "polydiorganosiloxane") units of formula (11):

wherein each occurrence of $R^g$ is each independently a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group wherein any of the aforementioned groups may be fully or partially halogenated with fluorine, chlorine, bromine, or iodine, or a combination thereof. Combinations of the foregoing $R^g$ groups may be used in the same copolymer. In an embodiment, the polysiloxane comprises $R^g$ groups that have a minimum hydrocarbon content. In a specific embodiment, an $R^g$ group with a minimum hydrocarbon content is a methyl group.

The value of E in formula (11) may vary widely depending on the type and relative amount of each component in the thermoplastic composition, the desired properties of the composition, and like considerations. Herein, E has an average value of 4 to 50. In an embodiment, E has an average value of 16 to 50, specifically 20 to 45, and more specifically 25 to 45. In another embodiment, E has an average value of 4 to 15, specifically 5 to 15, more specifically 6 to 15, and still more specifically 7 to 12.

In an embodiment, polydiorganosiloxane units are derived from dihydroxy aromatic compound of formula (12):

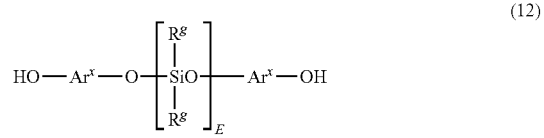

wherein E is as defined above; each $R^g$ may independently be the same or different, and is as defined above; and $Ar^x$ may each independently be the same or different, and is a substituted or unsubstituted $C_{6-30}$ arylene group, wherein the bonds are directly connected to an aromatic moiety. Suitable $Ar^x$ groups in formula (12) may be derived from a $C_{6-30}$ dihydroxy aromatic compound, for example a dihydroxy aromatic compound of formula (3), (4), (8), or (9) above. Combinations comprising greater than or equal to one of the foregoing dihydroxy aromatic compounds may also be used. Exemplary dihydroxy aromatic compounds are resorcinol (i.e., 1,3-dihydroxybenzene), 4-methyl-1,3-dihydroxybenzene, 5-methyl-1,3-dihydroxybenzene, 4,6-dimethyl-1,3-dihydroxybenzene, 1,4-dihydroxybenzene, 1,1-bis(4-hydroxyphenyl)methane, 1,1-bis(4-hydroxyphenyl) ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane. Combinations comprising greater than or equal to one of the foregoing dihydroxy compounds may also be used. In an embodiment, the dihydroxy aromatic compound is unsubstituted, or is not substituted with non-aromatic hydrocarbon-containing substituents such as, for example, alkyl, alkoxy, or alkylene substituents.

In a specific embodiment, where $Ar^x$ is derived from resorcinol, the polydiorganosiloxane repeating units are derived from dihydroxy aromatic compounds of formula (13):

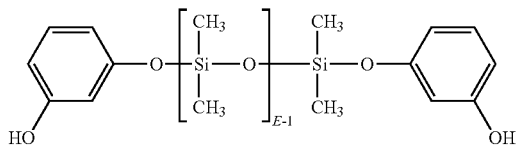

(13)

or, where $Ar^x$ is derived from bisphenol A, from dihydroxy aromatic compounds of formula (14):

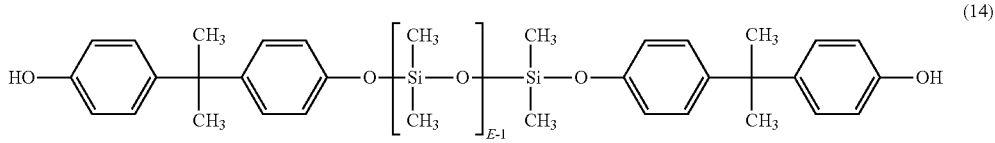

(14)

wherein E is as defined above.

In another embodiment, polydiorganosiloxane units are derived from dihydroxy aromatic compound of formula (15):

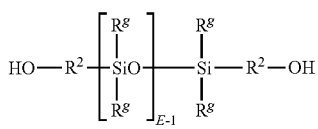

(15)

wherein $R^g$ and E are as described above, and $R^2$ is each independently a divalent $C_{1-30}$ alkylene or $C_{7-30}$ arylene-alkylene, and wherein the polymerized polysiloxane unit is the reaction residue of its corresponding dihydroxy aromatic compound. In a specific embodiment, where $R^2$ is $C_{7-30}$ arylene-alkylene, the polydiorganosiloxane units are derived from dihydroxy aromatic compound of formula (16):

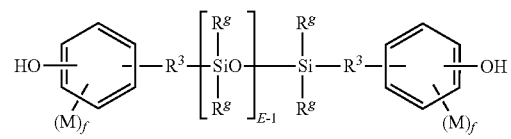

(16)

wherein $R^g$ and E are as defined above. $R^3$ is each independently a divalent $C_{2-8}$ aliphatic group. M is each independently a halogen, cyano, nitro, $C_{1-8}$ alkylthio, $C_{1-8}$ alkyl, $C_{1-8}$ alkoxy, $C_{2-8}$ alkenyl, $C_{2-8}$ alkenyloxy group, $C_{3-8}$ cycloalkyl, $C_{3-8}$ cycloalkoxy, $C_{6-10}$ aryl, $C_{6-10}$ aryloxy, $C_{7-12}$ arylalkyl, $C_{7-12}$ arylalkoxy, $C_{7-12}$ alkylaryl, or $C_{7-12}$ alkylaryloxy, wherein f is each independently 0, 1, 2, 3, or 4.

In an embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^3$ is a dimethylene, trimethylene or tetramethylene group; and $R^g$ is a $C_{1-8}$ alkyl, haloalkyl such as trifluoropropyl, cyanoalkyl, or aryl such as phenyl, chlorophenyl or tolyl. In another embodiment, $R^g$ is methyl, or a combination of methyl and trifluoropropyl, or a combination of methyl and phenyl. In still another embodiment, M is methoxy, n is 0 or 1, $R^3$ is a divalent $C_{1-3}$ aliphatic group, and $R^g$ is methyl.

In a specific embodiment, the polydiorganosiloxane units are derived from a dihydroxy aromatic compound of formula (17):

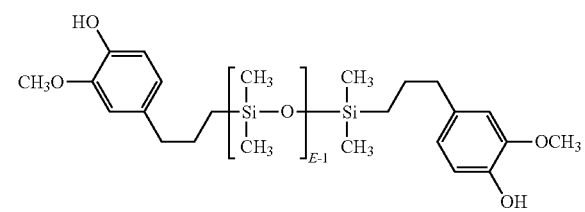

(17)

wherein E is as described above.

In another specific embodiment, the polydiorganosiloxane units are derived from dihydroxy aromatic compound of formula (18):

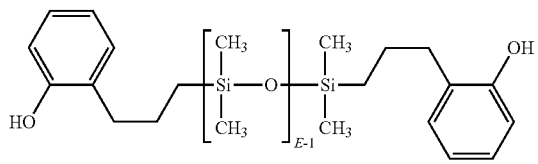

(18)

wherein E is as defined above.

Dihydroxy polysiloxanes typically can be made by functionalizing a substituted siloxane oligomer of formula (19):

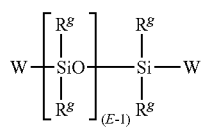

(19)

wherein $R^g$ and E are as previously defined, and W is hydrogen, halogen (Cl, Br, I), or carboxylate. Exemplary carboxylates include acetate, formate, benzoate, and the like. In an exemplary embodiment, where W is H, compounds of formula (19) may be prepared by platinum catalyzed addition with an aliphatically unsaturated monohydric phenol. Suitable aliphatically unsaturated monohydric phenols included, for example, eugenol, 2-allylphenol, 4-allylphenol, 4-allyl-2-methylphenol, 4-allyl-2-phenylphenol, 4-allyl-2-bromophenol, 4-allyl-2-t-butoxyphenol, 4-phenyl-2-allylphenol, 2-methyl-4-propenylphenol, 2-allyl-4,6-dimethylphenol, 2-allyl-4-bromo-6-methylphenol, 2-allyl-6-methoxy-4-methylphenol, and 2-allyl-4,6-dimethylphenol. Combinations comprising greater than or equal to one of the foregoing may also be used. Where W is halogen or carboxylate, functionalization may be accomplished by reaction with a dihydroxy aromatic compound of formulas (3), (4), (8), (9), or a combination comprising greater than or equal to one of the foregoing dihydroxy aromatic compounds. In an exemplary embodiment, compounds of formula (12) may be formed from an alpha, omega-bisacetoxypolydiorangonosiloxane, and a dihydroxy aromatic compound under phase transfer conditions.

In a specific embodiment, copolycarbonate terpolymers include those with polycarbonate units of formula (1) wherein $R^1$ is a $C_{6-30}$ arylene group, polysiloxane units derived from siloxane diols of formula (14), (17), or (18), and polyester units wherein T is a $C_{6-30}$ arylene group. In an embodiment, T is derived from isophthalic and/or terephthalic acid, or reactive chemical equivalents thereof. In another embodiment, $R^1$ is derived from the carbonate reaction product of a resorcinol of formula (9), or a combination of a resorcinol of formula (9) and a bisphenol of formula (4).

The relative amount of each type of unit in the foregoing terpolymer will depend on the desired properties of the terpolymer, and are readily determined by one of ordinary skill in the art without undue experimentation, using the guidelines provided herein. For example, the polycarbonate-polyester-polysiloxane terpolymer can comprise siloxane units in an amount of 0.1 to 25 weight percent (wt. %), specifically 0.2 to 10 wt. %, more specifically 0.2 to 6 wt. %, even more specifically 0.2 to 5 wt. %, and still more specifically 0.25 to 2 wt. %, based on the total weight of the polycarbonate-polyester-polysiloxane terpolymer, with the proviso that the siloxane units are provided by polysiloxane units covalently bonded in the polymer backbone of the polycarbonate-polyester-polysiloxane terpolymer. The polycarbonate-polyester-polysiloxane terpolymer can further comprise 0.1 to 49.85 wt. % carbonate units, 50 to 99.7 wt. % ester units, and 0.2 to 6 wt. % polysiloxane units, based on the total weight of the polysiloxane units, ester units, and carbonate units. Alternatively, the polycarbonate-polyester-polysiloxane terpolymer comprises 0.25 to 2 wt. % polysiloxane units, 60 to 96.75 wt. % ester units, and 3.25 to 39.75 wt. % carbonate units, based on the total weight of the polysiloxane units, ester units, and carbonate units.

In one embodiment, the first polycarbonate is selected from greater than or equal to one of the following: a homopolycarbonate derived from a bisphenol; a copolycarbonate derived from more than one bisphenol; and a copolymer derived from one or more bisphenols and having one or more aliphatic ester units or aromatic ester units or siloxane units.

The first polycarbonate comprises structural units derived from a branching agent. Branched polycarbonate blocks can be prepared by adding a branching agent during polymerization. These branching agents include polyfunctional organic compounds containing greater than or equal to three functional groups selected from hydroxyl, carboxyl, carboxylic anhydride, haloformyl, and mixtures of the foregoing functional groups. Specific examples include trimellitic acid, trimellitic anhydride, trimellitic trichloride (TMTC), tris-p-hydroxy phenyl ethane (THPE), 3,3-bis-(4-hydroxyphenyl)-oxindole (also known as isatin-bis-phenol), tris-phenol TC (1,3,5-tris((p-hydroxyphenyl)isopropyl)benzene), tris-phenol PA (4(4(1,1-bis(p-hydroxyphenyl)-ethyl) alpha,alpha-dimethyl benzyl)phenol), 4-chloroformyl phthalic anhydride, trimesic acid, and benzophenone tetracarboxylic acid. The branching agents can be added at a level of 0.05 to 2.0 wt. %. Mixtures comprising linear polycarbonates and branched polycarbonates can be used.

In some embodiments, a particular type of branching agent is used to create branched polycarbonate materials. These branched polycarbonate materials have statistically more than two end groups. The branching agent is added in an amount (relative to the bisphenol monomer) that is sufficient to achieve the desired branching content, that is, more than two end groups. The molecular weight of the polymer may become very high upon addition of the branching agent and may lead to viscosity problems during phosgenation. Therefore, in some embodiments, an increase in the amount of the end-capping agent is used in the polymerization. The amount of end-capping agent used when the particular branching agent is used is generally higher than if only a end-capping agent alone is used. The amount of end-capping agent used is generally above 5 mole percent and less than 20 mole percent compared to the bisphenol monomer.

In some embodiments, the branching agent is a structure derived from a triacid trichloride of the formula (20):

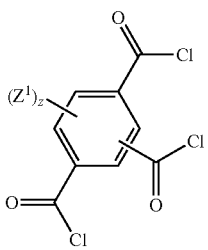

(20)

wherein $Z^1$ is hydrogen, a halogen, $C_{1-3}$ alkyl group, $C_{1-3}$ alkoxy group, $C_{7-12}$ arylalkyl, alkylaryl, or nitro group, and z is 0 to 3; or a branching agent derived from a reaction with a tri-substituted phenol of the formula (21):

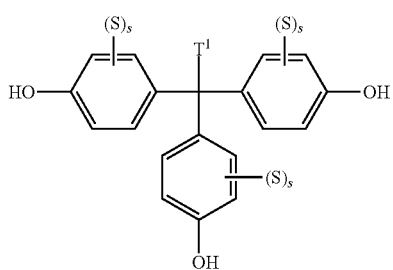

(21)

wherein $T^1$ is a $C_{1-20}$ alkyl group, $C_{1-20}$ alkyleneoxy group, $C_{7-12}$ arylalkyl, or alkylaryl group, S is hydrogen, a halogen, $C_{1-3}$ alkyl group, $C_{1-3}$ alkoxy group, $C_{7-12}$ arylalkyl, alkylaryl, or nitro group, s is 0 to 4.

In another embodiment, the branching agent is a structure having formula (22):

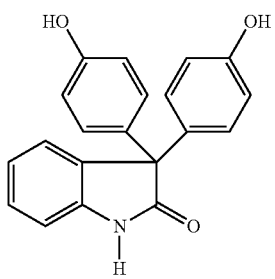

(22)

Examples of specific branching agents that are particularly effective in the compositions include trimellitic trichloride (TMTC), tris-p-hydroxy phenyl ethane (THPE) and isatin-bis-phenol. In one embodiment, in formula (20), Z is hydrogen and z is 3. In another embodiment, in formula (21), S is hydrogen, T' is methyl and s is 4.

The relative amount of branching agents used in the manufacture of the polymer will depend on a number of considerations, for example the type of $R^1$ groups, the amount of end capping agent, and the desired molecular weight of the polycarbonate. In general, the amount of branching agent is effective to provide 0.1 to 10 branching units per 100 $R^1$ units, specifically 0.5 to 8 branching units per 100 $R^1$ units, and more specifically 0.75 to 5 branching units per 100 $R^1$ units. For branching agents having formula (20), the amount of branching tri-ester units are present in an amount of 0.1 to 10 branching units per 100 $R^1$ units, specifically 0.5 to 8 branching units per 100 $R^1$ units, and more specifically 0.75 to 5 tri-ester units per 100 $R^1$ units. For branching agents having formula (21), the amount of branching tricarbonate units are present in an amount of 0.1 to 10 branching units per 100 $R^1$ units, specifically 0.5 to 8 branching units per 100 $R^1$ units, and more specifically 0.75 to 5 tricarbonate units per 100 $R^1$ units. In some embodiments, a combination of two or more branching agents may be used.

In one embodiment, the first polycarbonate has a branching level greater than or equal to 2% or greater than or equal to 3%.

Various types of end-capping agents can be utilized. In one embodiment, the end-capping agent is selected based upon the molecular weight of the polycarbonate and the branching level imparted by the branching agent. The desired goal is achieve a thin walled article with good flame retardance, e.g. a composition wherein a molded article of the composition has a UL94 V0 rating at a thickness less than or equal to 1.5 millimeters (mm), or, more specifically, 1.2 mm, or more specifically 1.0 mm.

Without being bound by theory, the pKa of the end-capping agent can be of importance in achieving a thin-walled article of manufacture with a UL94 V0 rating. The pKa of an end-capping agent is a measure of its relative acidity. The lower the pKa value of the end-capping agent the more acidic the end-capping agent. It was unexpectedly observed that the pKa of an end-capping agent is one indicator of the flame retardancy of the branched polycarbonate. For example lower pKas provide better flame retardant properties than higher pKas for branched polycarbonates.

In one embodiment, the end-capping agent has a pKa of 8.3 to 11. In another embodiment, the end-capping agent has a pKa of 8.3 to 10. In a further embodiment, the end-capping agent has a pKa of 9 to 11.

In another embodiment, the end-capping agents are selected from greater than or equal to one of the following: phenol or a phenol containing one or more substitutions with greater than or equal to one of the following: aliphatic groups, olefinic groups, aromatic groups, halogens, ester groups, cyano groups, and ether groups.

Of particular usefulness commercially, in another embodiment, the end-capping agents are selected from greater than or equal to one of the following: phenol, para-t-butylphenol or para-cumylphenol.

A certain type of end-group, e.g. p-cyanophenol, attached to the ends of branched polycarbonate chains can also provide anti-dripping benefits during UL testing. Not all branched polycarbonates are formed from p-cyanophenol end-capping agents however.

A general way has been discovered to design polycarbonates by balancing molecular weight, branching level and end-group type to produce transparent polycarbonate formulations that are easily molded into thin wall articles and have excellent UL94 properties. This involves measuring the peak melt viscosity of the polycarbonate between 350° C. and 450° C. during a melt rheology test. The "peak melt viscosity" is the highest melt viscosity value (in poise) achieved between 350° C. and 450° C. during rheological testing of a polycarbonate resin.

In some embodiments the first polycarbonate has a peak melt viscosity at or above 25,000 poise between 350° C. and 450° C. In some embodiments the first polycarbonate has a peak melt viscosity of 7,000 poise between 350° C. and 450° C.

Furthermore after measuring the peak melt viscosity of many polycarbonate resins having different levels of branching, MW (weight average molecular weight of the polycarbonate containing said end-capping agent and said branching agent) and different types of end-capping agents a relationship has been discovered between the branching level, BL (moles branching agent/moles bisphenol(s)), MW (by GPC using polycarbonate standards) and pKa of the end-capping agent. This relationship is expressed in the following polynomial equation:

Peak Melt Viscosity=$-57135.91+36961.39*BL+ 14001.13*MW^{1/3}-46944.24*pKa- 322.51*BL*MW^{1/3}-2669.19*BL*pKa+ 215.83*MW^{1/3}*pKa+1125.63*BL^2- 200.11*MW^{2/3}+2231.15*pKa^2$ wherein BL is the mole ratio of branching agent in the formulation determined by dividing the number of moles of branching agent by the total number of moles of bisphenol or bisphenols in the composition, the MW is the weight-averaged molecular weight of the polycarbonate containing said branching agent and said end-capping agent as determined by gel permeation chromatography using polycarbonate standards, and the pKa is the pKa of the end-capping agent.

The equation above allows the design of a wide range of first polycarbonate resins that will have excellent UL94 V0 properties at thin wall thicknesses. Designing the polycarbonate resins involves selecting an end-capping agent and adjusting the MW of the resin and the branching level of the resin in the manufacturing process so that the calculated or measured peak melt viscosity, e.g. has a high value 7000 poise or greater for 1.5 mm or greater and 25,000 poise or greater for 1.0 mm or greater. If the pKa of the end-capping agent has a low value (for example methyl-p-hydroxy benzoate with a pKA of 8.) the MW and the amount branching level needed to achieve a UL94 V0 performance can be lower. If the pKa of the end-capping agent is higher (for example p-t-butylphenol with a pKa of 10.3) then the MW and the branching level will need to be higher. Furthermore after the end-capping agent is selected, a choice can be made between balancing the molecular weight with the level of branching agent in the manufacturing process. The balance between the factors can be done without undue experimentation.

Without being bound by theory the viscosity behavior of the first polycarbonate as it passes through the temperature range between 350° C. and 450° C. reflects the beginning of the building up of a polymeric network that impacts the dripping behavior of the resin during UL94 flame testing. Polycarbonate resins that build this network to a higher degree (reflected in a higher peak melt viscosity value in the rheological test) seem to perform better in the UL flame testing at thin walls. The higher the value of the peak melt viscosity the thinner the wall thickness can be for a UL94 V0 pass.

The molecular weight of the first polycarbonate may vary depending on various end uses or other performance properties. The molecular weight of the first polycarbonate can have a value of 20,000 g/mol to 55,000 g/mol, or, more specifically, 20,000 g/mol to 40,000 g/mol as measured by gel permeation chromatography using polycarbonate standards.

The first polycarbonate can be present in an amount of 15 to 50 weight percent, based on the combined weight of the first, second and third polycarbonates. Within this range the amount of the first polycarbonate can be greater than or equal to 20 weight percent, or greater than or equal to 25 weight percent. Also within this range the amount of the first polycarbonate can be less than or equal to 45 weight percent, or less than or equal to 40 weight percent.

B. Second Polycarbonate

The second polycarbonate comprises structural units derived from HO-$A^1$-$Y^1$-$A^2$-OH and structural units derived from HO-$A^1$-$Y^2$-$A^2$-OH wherein each of $A^1$ and $A^2$ is a monocyclic divalent aryl group as described above with regard to the first polycarbonate, Y' is an aliphatic bridging group or bridging group comprising one to three atoms with the proviso that greater than or equal to one of the atoms is a hetero atom, and $Y^2$ is an aromatic group having 6 to 30 carbon atoms. The second polycarbonate has a glass transition temperature (Tg) greater than or equal to 170° C. as measured using a differential scanning calorimetry method. The Tg can be greater than or equal to 175° C., or, greater than or equal to 180° C., or, greater than or equal to 185° C. The Tg can be less than or equal to 250° C.

Specific examples of bisphenol compounds that can be represented by the formula HO-$A^1$-$Y^1$-$A^2$-OH include 1,1-bis(4-hydroxyphenyl)methane, 1,1-bis(4-hydroxyphenyl)ethane, 2,2-bis(4-hydroxyphenyl)propane (hereinafter "bisphenol A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, and 1,1-bis(4-hydroxy-3-methylphenyl)cyclohexane (DMBPC). Combinations comprising greater than or equal to one of the foregoing dihydroxy compounds can also be used.

Non-limiting examples of dihydroxy compounds of formula HO-$A^1$-$Y^2$-$A^2$-OH include 3,3-bis(4-hydroxyphenyl)-2-phenylisoindolin-1-one (PPPBP), 4,4'-(1-phenylethane-1,1-diyl)diphenol (Bisphenol AP) as well as adamantyl containing aromatic dihydroxy compounds and fluorene containing aromatic dihydroxy compounds.

The dihydroxy compounds of the formula HO-$A^1$-$Y^2$-$A^2$-OH can have the following formula (11):

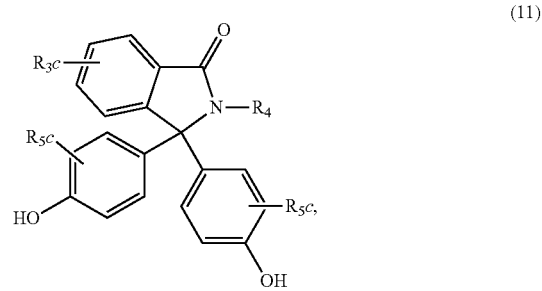

(11)

wherein $R_3$ and $R_5$ are each independently a halogen or a $C_{1-6}$ alkyl group, $R_4$ is a $C_{1-6}$ alkyl, phenyl, or phenyl substituted with up to five halogens or $C_{1-6}$ alkyl groups, and c is 0 to 4. In a specific embodiment, $R_4$ is a $C_{1-6}$ alkyl or phenyl group. In still another embodiment, $R_4$ is a methyl or phenyl group. In another specific embodiment, each c is 0.

A specific example of dihydroxy compounds of formula HO-$A^1$-$Y^2$-$A^2$-OH can be the following formula (6):

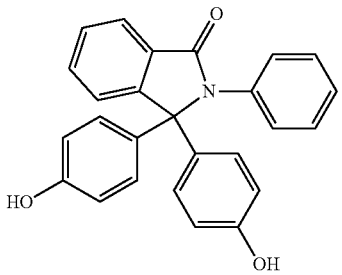

(6)

(also known as 3,3-bis(4-hydroxyphenyl)-2-phenylisoindolin-1-one (PPPBP)) also known as 2-phenyl-3,3-bis(4-hydroxyphenyl)phthalimidine.

Alternatively, the dihydroxy compounds of the formula HO-$A^1$-$Y^2$-$A^2$-OH can have the following formula (7):

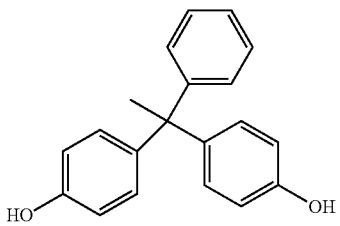

(7)

(also known as 4,4'-(1-phenylethane-1,1-diyl)diphenol (bisphenol AP) also known as 1,1-bis(4-hydroxyphenyl)-1-phenyl-ethane).

Dihydroxy compounds that can be used in combination with monomers that form polycarbonates with Tgs greater than 170° C. include aromatic dihydroxy compounds of formula (10):

(10)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

In some embodiments the second polycarbonate comprises structural units derived from bisphenol A and PPPBP. The structural units derived from PPPBP can be present in an amount of 20 to 40 mol % based on the total moles of structural units with the balance being derived from bisphenol A.

The second polycarbonate can be present in an amount of 20 to 50 weight percent based on the combined weight of the first, second and third polycarbonates. Within this range the second polycarbonate can be present in an amount greater than or equal to 25 weight percent or greater than or equal to 30 weight percent. Also within this range the second polycarbonate can be present in an amount less than or equal to 45 weight percent, or less than or equal to 40 weight percent.

C. Third Polycarbonate

The third polycarbonate comprises structural units of formula (1) as discussed above wherein at least a portion of $R^1$ is derived from bisphenol A. In fact, the third polycarbonate is similar to the first polycarbonate except that little or no branching agent is employed during synthesis. Accordingly, the description of the first polycarbonate presented above applies also to the third polycarbonate with the exception of branching level, melt viscosity, and molecular weight. The third polycarbonate has a branching level of 0 to less than 2%. The molecular weight can be 17,000 to 40,000 as measured by gel permeation chromatography using polycarbonate standards.

The third polycarbonate can be present in an amount of 15 to 50 weight percent based on the combined weight of the first, second and third polycarbonates. Within this range the third polycarbonate can be present in an amount greater than or equal to 20 weight percent or greater than or equal to 25 weigh percent. Also within this range the second polycarbonate can be present in an amount less than or equal to 40 weight percent, or less than or equal to 35 weight percent.

D. Flame Retardant

Exemplary flame retardants comprising a sulfonate salt include potassium perfluorobutane sulfonate (Rimar salt), potassium perfluoroctane sulfonate, tetraethylammonium perfluorohexane sulfonate, potassium diphenylsulfone sulfonate (KSS), and the like.

The foregoing flame retardant additives are present in amounts of 0.01 to 1 wt. %, more specifically 0.02 to 0.9 wt. %, based on the combined weight of the first, second and third polycarbonates.

E. Additives

The thermoplastic composition can include various additives ordinarily incorporated in polycarbonate compositions of this type, with the proviso that the additives are selected so as to not significantly adversely affect the desired properties of the polycarbonate, for example, transparency and flame retardance. Combinations of additives can be used. Such additives can be mixed at a suitable time during the mixing of the components for forming the composition.

Various additives can be incorporated into the composition of matters encompassed by this disclosure/claimed invention.

In one embodiment, one or more additives are selected from greater than or equal to one of the following: impact modifier, UV stabilizing additives, thermal stabilizing additives, mold release agents, colorants, organic and inorganic fillers, and gamma-stabilizing agents.

Possible fillers or reinforcing agents include, for example, silicates and silica powders such as aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dihydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin comprising various coatings known in the art to facilitate compatibility with the polycarbonate polymeric matrix, or the like; single crystal fibers or "whiskers" such as silicon carbide, alumina, boron carbide, iron, nickel, copper, or the like; fibers (including continuous and chopped fibers) such as asbestos, carbon fibers, glass fibers, such as E, A, C, ECR, R, S, D, or NE glasses, or the like; sulfides such as molybdenum sulfide, zinc sulfide or the like; barium compounds such as barium titanate, barium ferrite, barium sulfate, heavy spar, or the like; metals and metal oxides such as particulate or fibrous aluminum, bronze, zinc, copper and nickel or the like; flaked fillers such as glass flakes, flaked silicon carbide, aluminum diboride, aluminum flakes, steel flakes or the like; fibrous fillers, for example short inorganic fibers such as those derived from blends comprising greater than or equal to one of aluminum silicates, aluminum oxides, magnesium oxides, and calcium sulfate hemihydrate or the like; natural fillers and reinforcements, such as wood flour obtained by pulverizing wood, fibrous products such as cellulose, cotton, sisal, jute, starch, cork flour, lignin, ground nut shells, corn, rice grain husks or the like; organic fillers such as polytetrafluoroethylene; reinforcing organic fibrous fillers formed from organic polymers capable of forming fibers such as poly (ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers and reinforcing agents such as mica, clay, feldspar, flue dust, fillite, quartz, quartzite, perlite, tripoli, diatomaceous earth, carbon black, or the like, or combinations comprising greater than or equal to one of the foregoing fillers or reinforcing agents.

The fillers and reinforcing agents can be coated with a layer of metallic material to facilitate conductivity, or surface treated with silanes to improve adhesion and dispersion with the polycarbonate polymeric matrix. In addition, the reinforcing fillers can be provided in the form of monofilament or multifilament fibers and can be used individually or in combination with other types of fiber, through, for example, co-weaving or core/sheath, side-by-side, orange-type or matrix and fibril constructions, or by other methods known to one skilled in the art of fiber manufacture. Exemplary co-woven structures include, for example, glass fiber-carbon fiber, carbon fiber-aromatic polyimide (aramid) fiber, and aromatic polyimide fiberglass fiber or the like. Fibrous fillers can be supplied in the form of, for example, rovings, woven fibrous reinforcements, such as 0-90 degree fabrics or the like; non-woven fibrous reinforcements such as continuous strand mat, chopped strand mat, tissues, papers and felts or the like; or three-dimensional reinforcements such as braids. Fillers are generally used in amounts of 0 to 80 parts by weight, based on 100 parts by weight of the polymer component of the composition.

Exemplary antioxidant additives include, for example, organophosphites such as tris(nonyl phenyl)phosphite, tris (2,4-di-t-butylphenyl)phosphite ("IRGAFOS 168" or "I-168"), bis(2,4-di-t-butylphenyl)pentaerythritol diphosphite, distearyl pentaerythritol diphosphite or the like; alkylated monophenols or polyphenols; alkylated reaction products of polyphenols with dienes, such as tetrakis[methylene (3,5-di-tert-butyl-4-hydroxyhydrocinnamate)]methane, or the like; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl)propionate or the like; amides of beta-(3,5-di-tert-butyl-4-hydroxyphenyl)-propionic acid or the like, or combinations comprising greater than or equal to one of the foregoing antioxidants. Antioxidants are generally used in amounts of 0.0001 to 1 parts by weight, based on 100 parts by weigh of the polymer component of the thermoplastic composition (excluding any filler).

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like, phosphates such as trimethyl phosphate, or the like, or combinations comprising greater than or equal to one of the foregoing heat stabilizers. Heat stabilizers are generally used in amounts of 0.0001 to 1 parts by weight, based on 100 parts by weight of the polymer component of the thermoplastic composition.

Light stabilizers and/or ultraviolet light (UV) absorbing additives can also be used. Exemplary light stabilizer additives include, for example, benzotriazoles such as 2-(2-hydroxy-5-methylphenyl)benzotriazole, 2-(2-hydroxy-5-tert-octylphenyl)-benzotriazole and 2-hydroxy-4-n-octoxy benzophenone, or the like, or combinations comprising greater than or equal to one of the foregoing light stabilizers. Light stabilizers are generally used in amounts of 0.0001 to 1 parts by weight, based on 100 parts by weight of the polymer component of the thermoplastic composition.

Exemplary UV absorbing additives include for example, hydroxybenzophenones; hydroxybenzotriazoles; hydroxybenzotriazines; cyanoacrylates; oxanilides; benzoxazinones; 2-(2H-benzotriazol-2-yl)-4-(1,1,3,3-tetramethylbutyl)-phenol (CYASORB* 5411); 2-hydroxy-4-n-octyloxybenzophenone (CYASORB* 531); 2-[4,6-bis(2,4-dimethylphenyl)-1, 3,5-triazin-2-yl]-5-(octyloxy)-phenol (CYASORB* 1164); 2,2'-(1,4-phenylene)bis(4H-3,1-benzoxazin-4-one) (CYASORB* UV-3638); 1,3-bis[[(2-cyano-3,3-diphenylacryloyl) oxy]-2,2-bis[[(2-cyano-3,3-diphenylacryloyl)oxy]methyl] propane (UVINUL* 3030); 2,2'-(1,4-phenylene)bis(4H-3,1-benzoxazin-4-one); 1,3-bis[[(2-cyano-3,3-diphenylacryloyl) oxy]-2,2-bis[[(2-cyano-3,3-diphenylacryloyl)oxy]methyl] propane; nano-size inorganic materials such as titanium oxide, cerium oxide, and zinc oxide, all with particle size less than or equal to 100 nanometers; or the like, or combinations comprising greater than or equal to one of the foregoing UV absorbers. UV absorbers are generally used in amounts of 0.0001 to 1 parts by weight, based on 100 parts by weight of the polymer component of the thermoplastic composition.

Plasticizers, lubricants, and/or mold release agents can also be used. There is considerable overlap among these types of materials, which include, for example, phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl)phosphate of hydroquinone and the bis(diphenyl)phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate (PETS), and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising greater than or equal to one of the foregoing glycol polymers, e.g., methyl stearate and polyethylene-polypropylene glycol copolymer in a suitable solvent; waxes such as beeswax, montan wax, paraffin wax, or the like. Such materials are generally used in amounts of 0.001 to 1 parts by weight, specifically 0.01 to 0.75 parts by weight, more specifically 0.1 to 0.5 parts by weight, based on 100 parts by weight of the polymer component of the thermoplastic composition.

The term "antistatic agent" refers to monomeric, oligomeric, or polymeric materials that can be processed into polymer resins and/or sprayed onto materials or articles to improve conductive properties and overall physical performance. Examples of monomeric antistatic agents include glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, alkyl sulfonate salts such as sodium stearyl sulfonate, sodium dodecylbenzenesulfonate or the like, quaternary ammonium salts, quaternary ammonium resins, imidazoline derivatives, sorbitan esters, ethanolamides, betaines, or the like, or combinations comprising greater than or equal to one of the foregoing monomeric antistatic agents.

Exemplary polymeric antistatic agents include certain polyesteramides polyether-polyamide (polyetheramide) block copolymers, polyetheresteramide block copolymers, polyetheresters, or polyurethanes, each containing polyalkylene glycol moieties polyalkylene oxide units such as polyethylene glycol, polypropylene glycol, polytetramethylene glycol, and the like. Such polymeric antistatic agents are commercially available, for example PELESTAT* 6321 (Sanyo) or PEBAX* MH1657 (Atofina), IRGASTAT* P18 and P22 (Ciba-Geigy). Other polymeric materials that can be used as antistatic agents are inherently conducting polymers such as polyaniline (commercially available as PANIPOL*EB from Panipol), polypyrrole and polythiophene (commercially available from Bayer), which retain some of their intrinsic conductivity after melt processing at elevated temperatures. In one embodiment, carbon fibers, carbon nanofibers, carbon nanotubes, carbon black, or a combination comprising greater than or equal to one of the foregoing can be used in a polymeric resin containing chemical antistatic agents to render the composition electrostatically dissipative. Antistatic agents are generally used in amounts of 0.0001 to 5 parts by weight, based on 100 parts by weight of the polymer component of the thermoplastic composition.

Colorants such as pigment and/or dye additives can also be present provided they do not adversely affect flame retardant performance. Useful pigments can include, for example, inorganic pigments such as metal oxides and mixed metal oxides such as zinc oxide, titanium dioxides, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising greater than or equal to one of the foregoing pigments. Pigments are generally used in amounts of 0.01 to 10 parts by weight, based on 100 parts by weight of the polymer component of the thermoplastic composition.

Exemplary dyes are generally organic materials and include, for example, coumarin dyes such as coumarin 460 (blue), coumarin 6 (green), nile red or the like; lanthanide complexes; hydrocarbon and substituted hydrocarbon dyes; polycyclic aromatic hydrocarbon dyes; scintillation dyes such as oxazole or oxadiazole dyes; aryl- or heteroaryl-substituted poly ($C_{2-8}$) olefin dyes; carbocyanine dyes; indanthrone dyes; phthalocyanine dyes; oxazine dyes; carbostyryl dyes; napthalenetetracarboxylic acid dyes; porphyrin dyes; bis(styryl)biphenyl dyes; acridine dyes; anthraquinone dyes; cyanine dyes; methine dyes; arylmethane dyes; azo dyes; indigoid dyes, thioindigoid dyes, diazonium dyes; nitro dyes; quinone imine dyes; aminoketone dyes; tetrazolium dyes; thiazole dyes; perylene dyes, perinone dyes; bis-benzoxazolylthiophene (BBOT); triarylmethane dyes; xanthene dyes; thioxanthene dyes; naphthalimide dyes; lactone dyes; fluorophores such as anti-stokes shift dyes which absorb in the near infrared wavelength and emit in the visible wavelength, or the like; luminescent dyes such as 7-amino-4-methylcoumarin; 3-(2'-benzothiazolyl)-7-diethylaminocoumarin; 2-(4-biphenylyl)-5-(4-t-butylphenyl)-1,3,4-oxadiazole; 2,5-bis-(4-biphenylyl)-oxazole; 2,2'-dimethyl-p-quaterphenyl; 2,2-dimethyl-p-terphenyl; 3,5,3"",5""-tetra-t-butyl-p-quinquephenyl; 2,5-diphenylfuran; 2,5-diphenyloxazole; 4,4'-diphenylstilbene; 4-dicyanomethylene-2-methyl-6-(p-dimethylaminostyryl)-4H-pyran; 1,1'-diethyl-2,2'-carbocyanine iodide; 3,3'-diethyl-4,4',5,5'-dibenzothiatricarbocyanine iodide; 7-dimethylamino-1-methyl-4-methoxy-8-azaquinolone-2; 7-dimethylamino-4-methylquinolone-2; 2-(4-(4-dimethylaminophenyl)-1,3-butadienyl)-3-ethylbenzothiazolium perchlorate; 3-diethylamino-7-diethyliminophenoxazonium perchlorate; 2-(1-naphthyl)-5-phenyloxazole; 2,2'-p-phenylen-bis(5-phenyloxazole); rhodamine 700; rhodamine 800; pyrene, chrysene, rubrene, coronene, or the like; or combinations comprising greater than or equal to one of the foregoing dyes. Dyes are generally used in amounts of 0.01 to 10 parts by weight, based on 100 parts by weight of the polymer component of the thermoplastic composition.

Radiation stabilizers can also be present, specifically gamma-radiation stabilizers. Exemplary gamma-radiation stabilizers include alkylene polyols such as ethylene glycol, propylene glycol, 1,3-propanediol, 1,2-butanediol, 1,4-butanediol, meso-2,3-butanediol, 1,2-pentanediol, 2,3-pentanediol, 1,4-pentanediol, 1,4-hexandiol, and the like; cycloalkylene polyols such as 1,2-cyclopentanediol, 1,2-cyclohexanediol, and the like; branched alkylenepolyols such as 2,3-dimethyl-2,3-butanediol (pinacol), and the like, as well as alkoxy-substituted cyclic or acyclic alkanes. Unsaturated alkenols are also useful, examples of which include 4-methyl-4-penten-2-ol, 3-methyl-pentene-3-ol, 2-methyl-4-penten-2-ol, 2,4-dimethyl-4-pene-2-ol, and 9 to decen-1-ol, as well as tertiary alcohols that have greater than or equal to one hydroxy substituted tertiary carbon, for example 2-methyl-2,4-pentanediol (hexylene glycol), 2-phenyl-2-butanol, 3-hydroxy-3-methyl-2-butanone, 2-phenyl-2-butanol, and the like, and cyclic tertiary alcohols such as 1-hydroxy-1-methyl-cyclohexane. Certain hydroxymethyl aromatic compounds that have hydroxy substitution on a saturated carbon attached to an unsaturated carbon in an aromatic ring can also be used. The hydroxy-substituted saturated carbon can be a methylol group (—$CH_2OH$) or it can be a member of a more complex hydrocarbon group such as —$CR_4HOH$ or —$CR_{24}OH$ wherein $R^4$ is a complex or a simple hydrocarbon. Specific hydroxy methyl aromatic compounds include benzhydrol, 1,3-benzenedimethanol, benzyl alcohol, 4-benzyloxy benzyl alcohol and benzyl benzyl alcohol. 2-Methyl-2,4-pentanediol, polyethylene glycol, and polypropylene glycol are often used for gamma-radiation stabilization. Gamma-radiation stabilizing compounds are typically used in amounts of 0.1 to 10 parts by weight based on 100 parts by weight of the polymer component of the thermoplastic composition.

The thermoplastic compositions can be manufactured by various methods. For example, some or all of the components can be first blended in a HENSCHEL-Mixer* high speed mixer. Other low shear processes, including but not limited to hand mixing, can also accomplish this blending. The blend is then fed into the throat of a single or twin-screw extruder via a hopper. Alternatively, greater than or equal to one of the components can be incorporated into the composition by feeding directly into the extruder at the throat and/or downstream through a sidestuffer. Additives can also be compounded into a master batch with a desired polymeric resin and fed into the extruder. The extruder is generally operated at a temperature higher than that necessary to cause the composition to flow. The extrudate is immediately quenched in a water batch and pelletized. The pellets, so prepared, when cutting the extrudate can be one-fourth inch long or less as desired. Such pellets can be used for subsequent molding, shaping, or forming.

In some embodiments described above, the onset of high-temperature cross-linking can be controlled by adjusting the molecular weight of the end-capped polycarbonate or by the addition of certain flame retardant salts; in particular alkali metal salts of perfluorinated $C_{1-16}$ alkyl sulfonates. In one embodiment, the addition of an inorganic flame retardant (e.g., KSS) increases the temperature of the onset of cross-linking/branching in the polycarbonate by 20 to 80° C., specifically 40 to 60° C.

Shaped, formed, or molded articles comprising the thermoplastic compositions are also provided. The thermoplastic compositions can be molded into useful shaped articles by a variety of means such as injection molding, extrusion, rotational molding, blow molding and thermoforming to form articles such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. The compositions are of particular utility in the manufacture of thin walled articles such as housings for electronic devices. Additional examples of articles that can be formed from the compositions include electrical parts, such as relays, and enclosures, consumer electronics such as enclosures and parts for laptops, desktops, docking stations, PDAs, digital cameras, desktops, and telecommunications parts such as parts for base station terminals.

E. Polycarbonate Synthesis Processes

Polycarbonates can be manufactured by processes such as interfacial polymerization or melt polymerization. Although the reaction conditions for interfacial polymerization can vary, an exemplary process generally involves dissolving or dispersing a dihydric phenol reactant in aqueous caustic soda or potash, adding the resulting mixture to a water-immiscible solvent medium, and contacting the reactants with a carbonate precursor in the presence of a catalyst such as, for example, triethylamine or a phase transfer catalyst, under controlled pH conditions, e.g., 8 to 11. The most commonly used water immiscible solvents include methylene chloride, 1,2-dichloroethane, chlorobenzene, toluene, and the like.

Exemplary carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising greater than or equal to one of the foregoing types of carbonate precursors can also be used. In an exemplary embodiment, an interfacial polymerization reaction to form carbonate linkages uses phosgene as a carbonate precursor, and is referred to as a phosgenation reaction.

Among the phase transfer catalysts that can be used are catalysts of the formula $(R^5)_4Q+X^2$, wherein $R^5$ is each independently a $C_{1-10}$ alkyl group; Q is a nitrogen or phosphorus atom; and $X^2$ is a halogen atom or a $C_{1-8}$ alkoxy group or $C_{6-18}$ aryloxy group. Exemplary phase transfer catalysts include, for example, $[CH_3(CH_2)_3]_4NX^2$, $[CH_3(CH_2)_3]_4PX^2$, $[CH_3(CH_2)_5]_4NX^2$, $[CH_3(CH_2)_6]_4NX^2$, $[CH_3(CH_2)_4]_4NX^2$, $CH_3[CH_3(CH_2)_3]_3NX^2$, and $CH_3[CH_3(CH_2)_2]_3NX^2$, wherein $X^2$ is a halogen, a $C_{1-8}$ alkoxy group or a $C_{6-18}$ aryloxy group. In an embodiment $X^2$ is Cl or Br. In effective amount of a phase transfer catalyst can be 0.1 to 10 wt. % based on the weight of bisphenol in the phosgenation mixture. In another embodiment an effective amount of phase transfer catalyst can be 0.5 to 2 wt. % based on the weight of bisphenol in the phosgenation mixture.

Alternatively, melt processes can be used to make polycarbonates. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury* mixer, twin screw extruder, or the like to form a uniform dispersion. Volatile monohydric phenol is removed from the molten reactants by distillation and the polymer is isolated as a molten residue. A specifically useful melt process for making polycarbonates uses a diaryl carbonate ester having electron-withdrawing substituents on the aryls. Examples of specifically useful diaryl carbonate esters with electron withdrawing substituents include bis(4-nitrophenyl)carbonate, bis(2-chlorophenyl)carbonate, bis(4-chlorophenyl)carbonate, bis(methyl salicyl)carbonate, bis(4-methylcarboxylphenyl) carbonate, bis(2-acetylphenyl)carboxylate, bis(4-acetylphenyl)carboxylate, or a combination comprising greater than or equal to one of the foregoing.

Exemplary transesterification catalysts for making polycarbonate using a melt process include acetates, carbonates, borates, borohydrides, oxides, hydroxides, hydrides, and alcoholates of various metals including alkali metals such as lithium, sodium, and potassium, alkali earth metals such as magnesium, calcium and barium and other metals such as zinc, cadmium, tin, antimony, lead, manganese cobalt, or nickel. In addition, other useful transesterification catalysts include basic salts of nitrogen or phosphorus such as tetrabutylammonium hydroxide, methyltributylammonium hydroxide, tetrabutylammonium acetate, tetrabutylphosphonium hydroxide, tetrabutylphosphonium acetate, tetrabutylphosphonium phenolate. Combinations of greater than or equal to one of the foregoing are also useful.

F. Performance Properties

Achieving excellent flame performance, (UL94 V0) for thin wall articles (e.g. 2 mm and thinner) made from polycarbonate resins requires achieving short flame out times while preventing flaming drips during UL94 testing. Short flame out times are usually achieved through the use of flame retardant agents while flaming drips are prevented by adding anti-drip agents such as polytetrafluoroethylene (PTFE). In addition, achieving excellent flame performance for transparent thin wall articles is particularly challenging because anti-drip agents such as PTFE render the article translucent or opaque. Therefore preventing dripping has to be achieved by other means for transparent thin wall articles.

One way to reduce dripping is to increase the molecular weight of the polycarbonate resin but this approach reduces the flow of the resin during molding and so thin wall molds having long flow lengths or intricate designs are difficult to fill without increasing the molding temperature and risking polycarbonate molecular weight degradation and color formation. Branched polycarbonate resins can provide a partial solution to the flow problem because branching provides a means for the polycarbonate chains to entangle, thus reducing dripping without losing as much flow during molding. However branched polycarbonates with higher levels of branching (1% branching or above) can be difficult to make because when the branching is too high the polycarbonates form gels in the manufacturing process and sometimes during molding. Gels hurt the impact properties and the aesthetics of transparent polycarbonate articles and so highly branched polycarbonates are generally avoided in polycarbonate manufacture and in product formulations.

A certain type of end-group, e.g. p-cyanophenol, attached to the ends of branched polycarbonate chains can also provide anti-dripping benefits during UL testing. Not all branched polycarbonates are formed from p-cyanophenol end-capping agents however.

Previously, a UL94 V0 rating at low thicknesses was achieved by combining the first polycarbonate and a sulfonate salt. Similarly the first polycarbonate, sulfonate salt and a linear polycarbonate were combined for a material with excellent flame retardant properties. However, the material had less than desirable heat resistance. The first, second, and third polycarbonates have been combined with the sulfonate salt to make a composition having a desirable combination of properties, namely a UL94 V0 rating at 1.5, 1.2, or 1.0 millimeter thicknesses (or a combination of thicknesses), an HDT greater than or equal to 145° C., ductility greater than or equal to 90% at 23° C., and a multi axial impact greater than or equal to 50 Joules/meter at 23° C. It is also contemplate that the composition can have a UL94 V0 rating at a thickness less than 1.0 millimeter.

Melt volume flow rate (often abbreviated "MVR") measures the rate of extrusion of a thermoplastic through an orifice at a prescribed temperature and load. The composition can have an MVR, measured at 330° C. under a load of 2.16 kg, of 10 to 200 cubic centimeters per 10 minutes ($cm^3/10$ min), specifically 10 to 100 $cm^3/10$ min. MVR is measured by ASTM D 1238. In one embodiment, the composition has an MVR of greater than or equal to 15 $cm^3/10$ min. In a further embodiment, the composition has an MVR of 15 to 60 or 15 to 50 $cm^3/10$ min.

The thermoplastic compositions disclosed herein can have various haze levels. In one embodiment, the composition has a haze value of less than 3% at 3.2 mm thickness as determined by ASTM D1003, or, less than or equal to 2%, or, less than or equal to 1.5%. The composition can also have a light transmission value greater than or equal to 85%, also determined by ASTMD1003.

Ranges articulated within this disclosure, e.g. numerics/values, shall include disclosure for possession purposes and claim purposes of the individual points within the range, sub-ranges, and combinations thereof.

Various combinations of elements of this disclosure are encompassed by this invention, e.g. combinations of elements from dependent claims that depend upon the same independent claim.

The invention is further illustrated by the following non-limiting examples.

EXAMPLES

Testing Procedure & Description of Testing Components

Different composition of flame-retarded additives and PC are mixed together and pre-blended. Extrusion and molding is carried out under normal polycarbonate processing condition. The materials used are shown in Table 1. Amounts shown in the following tables is weight percent based on the combined amounts of the first, second and third polycarbonates.

TABLE 1

| Material | Properties |
|---|---|
| First PC | A branched polycarbonate having structural units derived from bisphenol A, a weight average molecular weight of 30,000 g/mol, a branching level of 3% and end capping groups derived from an end-capping agent having a pKa of 8.3. The branched polycarbonate has a peak melt viscosity of 25,000 poise. |
| Second PC A | A polycarbonate having structural groups derived from bisphenol A and PPPBP. The polycarbonate has a glass transition temperature of 198° C.. The amount of PPPBP was 33 mol %. |
| Second PC B | A polycarbonate having structural groups derived from bisphenol A and bisphenol AP. The polycarbonate has a glass transition temperature of 185° C.. |
| Second PC C | A polycarbonate having structural groups derived from bisphenol A and PPPBP. The polycarbonate has a glass transition temperature of 175° C.. The amount of PPPBP was 20 mol %. |
| Second PC D | A polycarbonate having structural groups derived from bisphenol A and PPPBP. The polycarbonate has a glass transition temperature of 210° C.. The amount of PPPBP was 40 mol %. |
| APEC 1803 | A polycarbonate having structural groups derived from bisphenol A and cyclohexyl bisphenol. The polycarbonate has a glass transition temperature of 185° C.. This material is commercially available from Bayer under the tradename APEC. |
| Third PC A | A polycarbonate having structural units derived from bisphenol A. The molecular weight was 22,000 g/mol. |
| Third PC B | A polycarbonate having structural units derived from bisphenol A. The molecular weight was 31,000 g/mol. |
| Potassium perfluorobutane sulfonate (Rimar salt) | |
| Potassium sulfone sulfonate (KSS) | |

The compositions further comprised an additive package of stabilizers and anti-oxidants with a combined amount of 0.351 weight percent based on 100 parts by weight of the polymer component of the thermoplastic composition.

Melt volume rate was tested as described above at the time interval shown in the tables below. MVR is reported in cubic centimeters per 10 minutes. Heat deformation temperature (HDT) was determined according to ASTM 648 and is reported in degrees Celsius. Multi-axial impact (MAI) was determined according to ASTMD 3763 at 23° C. and a thickness of 3.2 millimeters. MAI is reported in Joules (J). Ductility was tested according to ASTM D3763 and is reported in %. Yellowness index, light transmission, and haze were determined according to ASTM D1003. Yellowness index has no unit of measure, transmission is reported in % and haze is also reported in %.

Flammability testing was conducted using the standard Underwriters Laboratory UL94 test method (7 day conditioning), except that 20 bars rather than the usual 5 bars were tested. Specimens are to be preconditioned in an air-circulating oven for 168 hours at 70±1° C. and then cooled in the desiccator for greater than or equal to 4 hours at room temperature, prior to testing. Once removed from the desiccator, specimens shall be tested within 30 minutes. The data was analyzed by calculation of the average flame out time, standard deviation of the flame out time and the total number of drips. Statistical methods were used to convert the data to a probability that a specific formulation would achieve a first time V0 pass or "p(FTP)" in the standard UL94 testing of 5 bars. Preferably p(FTP) values will be 1 or very close to 1 for high confidence that a sample formulation would achieve a V0 rating in UL94 testing. A p(FTP) value below 0.85 for a sample formulation was considered too low to predict a UL94 rating of V0 for that formulation.

Flammability tests were performed following the procedure of Underwriter's Laboratory Bulletin 94 entitled "Tests for Flammability of Plastic Materials, UL94." Several ratings can be applied based on the rate of burning, time to extinguish, ability to resist dripping, and whether or not drips are burning. According to this procedure, materials can be classified as UL94 HB, V0, V1, V2, on the basis of the test results obtained for five samples. The criteria for each of these flammability classifications are described below.

HB: In a 5-inch sample, placed so that the long axis of the sample is horizontal to the flame, the rate of burn of the sample is less than 3 inches per minute, and the flame is extinguished before 4 inches of sample are burned.

V0: In a sample placed so that its long axis is 180 degrees to the flame, the average period of flaming and/or smoldering after removing the igniting flame does not exceed ten seconds and none of the vertically placed samples produces drips of burning particles that ignite absorbent cotton. Five bar flame out time (FOT) is the sum of the flame out time for five bars, each lit twice for a maximum flame out time of 50 seconds.

V1: In a sample placed so that its long axis is 180 degrees to the flame, the average period of flaming and/or smoldering after removing the igniting flame does not exceed twenty-five seconds and none of the vertically placed samples produces drips of burning particles that ignite absorbent cotton. Five bar flame out time is the sum of the flame out time for five bars, each lit twice for a maximum flame out time of 250 seconds.

V2: In a sample placed so that its long axis is 180 degrees to the flame, the average period of flaming and/or smoldering after removing the igniting flame does not exceed twenty-five seconds, but the vertically placed samples produce drips of burning particles that ignite cotton. Five bar flame out time is the sum of the flame out time for five bars, each lit twice for a maximum flame out time of 250 seconds.

DOE

First, a composition DOE (design of experiment) was conducted to determine the blend design space without FR agent. The design space was determined as a function of a set of constraints on practical impact (ductility and impact strength), heat distortion temperature as well as transparency and melt viscosity (for thin wall molding). Some of the data from the DOE is shown in Table 2. As can be seen the data it appears that the design space is quite small, showing the difficulty of obtaining a composition which meets these criteria. The compositions shown in Table 2 additionally comprised 0.39 weight percent of a additive package comprising a stabilizer, an anti-oxidant and a release agent.

TABLE 2

|  | A | B | C | D | E | F | G | H |
|---|---|---|---|---|---|---|---|---|
| First PC | 15 | 30 | 45 | 30 | 22.5 | 45 | 15 | 37.5 |
| Second PC A | 75 | 26.25 | 45 | 15 | 56.25 | 15 | 45 | 33.75 |
| Third PC A | 5 | 21.9 | 5 | 27.5 | 10.6 | 20 | 20 | 14.4 |
| Third PC B | 5 | 21.85 | 5 | 27.5 | 10.65 | 20 | 20 | 14.35 |
| Impact | 67.9 | 68.1 | 56.4 | 70 | 67.3 | 65.7 | 67.7 | 68.7 |
| Ductility | 20 | 100 | 60 | 100 | 100 | 100 | 100 | 100 |
| HDT | — | 134.6 | 142.1 | 130.7 | 148.8 | 130.4 | 145.5 | 139.3 |

Examples 1-7

Examples as shown in Table 3 were made and tested for MVR, ductility, multi-axial impact strength (MAI), and flame retardance. Results are shown in Table 3 as well.

TABLE 3

|  | 1 | 2* | 3 | 4* | 5* | 6* | 7 |
|---|---|---|---|---|---|---|---|
| First PC | 37.5 | 37.5 | 37.5 | — | 37.5 | 37.5 | 37.5 |
| Second PC A | 33.8 | 33.8 | 33.8 | 33.8 | 33.8 | 33.8 | 33.8 |
| Third PC B | 28.7 | — | — | 37.5 | 28.7 | — | — |
| Third PC A | — | 28.7 | 28.7 | 28.7 | — | 28.7 | 28.7 |
| Rimar salt | 0.08 | — | 0.08 | 0.08 | — | — | 0.08 |
| MVR (360 seconds) | 15.3 | 27.8 | 23.6 | 42.4 | 14.5 | 24.8 | 24.7 |
| MVR (1080 seconds) | 16 | 32.7 | 27.5 | 42.8 | 16 | 27.6 | 28 |
| Ductility | 100 | 100 | 100 | 100 | 100 | 100 | 100 |
| MAI | 60.7 | 60.4 | 63.8 | 71.2 | 59.2 | 61.8 | 54.9 |
| p(FTP) @ 1.5 mm | 0.99 | 0 | 0.99 | 0 | 0 | 0 | 0.99 |
| p(FTP) @ 1.0 mm | 0.99 | — | 0.99 | — | — | — | 0.99 |

*Comparative Examples

Table 2 shows that the combination of a branched polycarbonate, a high heat polycarbonate, and Rimar salt (potassium perfluorobutane sulfonate) is required to obtain a V0 rating at 1.0 mm. Compositions without the Rimar salt (Samples 2, 5 and 6) and the branched polycarbonate (Sample 4) all failed to achieve a V0 at 1.0 mm. Additionally, the inclusion of a third polycarbonate allows manipulation of the MVR value (see Examples 1 and 3).

Examples 8-13

Compositions using different high heat polycarbonates (different polycarbonates having a Tg greater than 170° C.) were made and tested. Results are shown in Table 4.

TABLE 4

|  | 8 | 9* | 10 | 11 | 12 |
|---|---|---|---|---|---|
| First PC | 37.5 | 37.5 | 37.5 | 28.3 | 37.5 |
| Second PC A | 33.8 | — | — | — | — |
| APEC | — | 33.8 | 33.8 | 50 | — |
| Second PC B | — | — | — | — | 33.8 |
| Third PC A | 28.7 | 28.7 | 28.7 | 21.7 | 28.7 |
| Rimar | 0.08 | — | 0.08 | 0.08 | 0.08 |

TABLE 4-continued

|  | 8 | 9* | 10 | 11 | 12 |
|---|---|---|---|---|---|
| MVR (360 seconds) | 23.6 | 19 | 19.9 | 18.8 | 50.8 |
| MVR (1080 seconds) | 27.5 | 21 | 21.3 | 20.4 | 32.5 |
| Ductility |  |  |  |  |  |
| p(FTP) @ 1.5 mm | — | — | — | — | 0.99 |
| p(FTP) @ 1.2 mm | — | 0 | 0.5 | 0.6 | — |
| p(FTP) @ 1.0 mm | 0.99 | — | — | — | — |
| HDT | 149 | 147 | 146 | 151 | 152 |
| Yellowing index (3.2 mm) | 2.7 | — | — | — | 10 |
| Transmission (3.2 mm) | 88.8 | — | — | — | 81.2 |
| Haze (3.2 mm) | 0.7 | — | — | — | 3.7 |

*Comparative Example

Examples 9-11 demonstrate that a high heat polycarbonate formed from a bisphenol comprising an aromatic group between the two phenol groups is required for flame retardance at thicknesses below 1.5 mm. Additionally, composition comprising a high heat polycarbonate formed from bisphenol A and PPPBP demonstrate excellent optical properties (low yellowing, high transmission and low haze).

Examples 13-21

Examples 13-21 used potassium sulfone sulfonate (KSS) in place of Rimar salt. The high heat polycarbonate was formed from bisphenol A and PPPBP. Composition and results are shown in Table 5.

TABLE 5

|  | 13* | 14 | 15 | 16 | 17 | 18 | 19 | 20 | 21 |
|---|---|---|---|---|---|---|---|---|---|
| First PC | 37.5 | 37.5 | 37.5 | 37.5 | 37.5 | 37.5 | 37.5 | 37.5 | 37.5 |
| Second PC A | 33.8 | 33.8 | 33.8 | 33.8 | 33.8 | 33.8 | 33.8 | 33.8 | 33.8 |
| Third PC A | 28.7 | 28.7 | 28.7 | 28.7 | 28.7 | 28.7 | 28.7 | 28.7 | 28.7 |
| KSS | — | 0.01 | 0.05 | 0.1 | 0.2 | 0.3 | 0.4 | 0.5 | 0.4 |
| MVR (360 seconds) | 24.3 | 24.6 | 21.3 | 20 | 26.5 | 22.6 | 31.2 | 34 | 25.7 |
| MVR (1080 seconds) | 26 | 26.6 | 27.1 | 27.2 | 28.6 | 30.2 | 30.2 | 30.6 | 31 |
| p(FTP) @ 1.5 mm | 0 | 0.1 | 0.6 | 0.8 | 0.9 | 0.8 | 0.7 | 0.8 | 0.6 |
| p(FTP) @ 1.0 mm | 0 | 0 | 0 | 0 | 0 | 0 | 0 | 0 | 0 |
| HDT | 148 | 149 | 149 | 150 | 148 | 150 | 149 | 149 | 148 |
| Yellowing index (3.2 mm) | 4 | 3.2 | 11.9 | 2.9 | 3.3 | 3.1 | 3.4 | 3.5 | 3.1 |
| Transmission (3.2 mm) | 88.1 | 88.7 | 84.8 | 89 | 88.8 | 88.8 | 88.7 | 88.6 | 88.9 |
| Haze (3.2 mm) | 2.3 | 1.4 | 1.9 | 1.1 | 1.3 | 1.2 | 1.5 | 1.8 | 1.2 |

Examples 13-21 show that good flame retardance and other physical properties can be obtained with KSS, particularly when the KSS is used in amounts of 0.1 to 0.4 weight percent, more particularly 0.1 to 0.3 weight percent. Contrary to expectation, flame retardance actually decreases with increasing amounts of KSS over 0.3 weight percent.

Examples 22-27

Examples 22-27 were made as described above and examine the effect of differing amounts of the PPPBP monomer on the properties of the overall composition.

TABLE 6

|  | 23* | 24 | 25* | 26 | 27* | 28 |
|---|---|---|---|---|---|---|
| First PC | 37.5 | 37.5 | 37.5 | 37.5 | 37.5 | 37.5 |
| Second PC A | 33.8 | 33.8 | 0 | 0 | 0 | 0 |
| Second PC C | 0 | 0 | 33.8 | 33.8 | 0 | 0 |
| Second PC D | 0 | 0 | 0 | 0 | 33.8 | 33.8 |
| Third PC B | 28.7 | 28.7 | 28.7 | 28.7 | 28.7 | 28.7 |
| Potassium Perfluorobutane Sulfonate (Rimar) | 0 | 0.08 | 0 | 0.08 | 0 | 0.08 |

TABLE 6-continued

|  | 23* | 24 | 25* | 26 | 27* | 28 |
|---|---|---|---|---|---|---|
| MVR (330 C., 2.16 Kg, 360 s) | 13.8 | 15.8 | 17.4 | 17.5 | 12.4 | 12.9 |
| MVR (330 C., 2.16 Kg, 1080 s) | 16.7 | 17.5 | 19.3 | 19.2 | 13.6 | 14.4 |
| MAI Energy to max load (23° C., 3.2 mm) | 57.3 | 53.6 | 48.5 | 49.7 | 48.9 | 51 |
| MAI Ductility (23° C., 3.2 mm) | 100 | 80 | 100 | 100 | 100 | 100 |
| HDT (0.455 Mpa, 3.2 mm) | — | — | — | 148.2 | 154.3 | 153.6 |
| Yellowness Index @ 3.2 mm | 3.3 | 3.5 | 4.3 | 4.5 | 5.1 | X |
| Transmission @ 3.2 mm | 87.4 | 88.5 | 81.5 | 88.3 | 87.2 | X |
| Haze @ 3.2 mm | 2.4 | 1.7 | 1.8 | 2.4 | 4.6 | X |
| p(FTP) @ 1.5 mm | 0 | 0.99 | 0 | 0.91 | 0 | 0.99 |
| p(FTP) @ 1.2 mm | 0 | 0.96 | 0 | 0.67 | 0 | 0.9 |
| p(FTP) @ 1.0 mm | 0 | 0.6 | 0 | 0.5 | 0 | 0.94 |
| p(FTP) @ 0.8 mm | 0 | 0.81 | 0 | 0 | 0 | 0 |

*Comparative Example

These examples demonstrate that at thicknesses less than or equal to 1.2 millimeters it can be desirable to use a second PC having greater than 20 mol % PPPBP content.

Set forth below are some examples of the composition.

Embodiment 1

A composition comprising a flame retardant comprising a sulfonate salt; 15 to 50 weight percent of a first polycarbonate, wherein the first polycarbonate comprises structural units of formula (I)

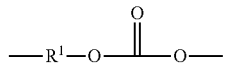

wherein at least 60 percent of the total number of $R^1$ groups comprise aromatic groups and the balance thereof are aliphatic or alicyclic groups, and terminal groups derived from an end-capping agent, wherein the first polycarbonate has a branching level of greater than or equal to 2%, a weight average molecular weight of 20,000 to 55,000 g/mol as measured by gel permeation chromatography using polycarbonate standards, and a peak melt viscosity greater than or equal to 25,000 poise when measured using a parallel plate melt rheology test at a heating rate of 10 degrees C./minute at a temperature of 350 to 450° C. at a frequency of 3 radians/second and a strain amplitude of 9%; 20 to 50 weight percent of a second polycarbonate having a glass transition temperature greater than or equal to 170° C., wherein the second polycarbonate comprises structural units derived from HO-$A^1$-$Y^1$-$A^2$-OH and structural units derived from HO-$A^1$-$Y^2$-$A^2$-OH wherein each of $A^1$ and $A^2$ is a monocyclic divalent aryl group, $Y^1$ is an aliphatic bridging group or bridging group comprising one to three atoms with the proviso that at least one of the atoms is a hetero atom, and $Y^2$ is an aromatic group having 6 to 30 carbon atoms, and 15 to 50 weight percent of a third polycarbonate comprising structural units derived from bisphenol A and having a branching level of 0 to less than 2%, and a molecular weight of 17,000 to 40,000 g/mol as measured by gel permeation chromatography using polycarbonate standards, wherein weight percent is based on the combined weight of the first, second and third polycarbonates and the composition has a heat distortion temperature greater than or equal to 145° C., ductility greater than or equal to 90% at 23 degrees C., multi-axial impact greater than or equal to 50 J/m at 23° C., and a molded article of the composition has a UL 94 V0 rating at a thickness of 1.5 mm.

Embodiment 2

The composition of Embodiment 1, wherein the flame retardant comprises potassium perfluorobutane sulfonate.

Embodiment 3

The composition of either of Embodiments 1 or 2, wherein the end-capping agent comprises phenol or a phenol containing one or more substitutions comprising aliphatic groups, olefinic groups, aromatic groups, halogens, ester groups, ether groups, halogens, cyano groups, or combinations thereof.

Embodiment 4

The composition of any of Embodiments 1 to 3, wherein the end-capping agent comprises phenol, p-t-butylphenol, p-cumylphenol, or combinations thereof.

Embodiment 5

The composition of any of Embodiments 1 or 2, wherein the end-capping agent has a pKa of 8.3 to 11.

Embodiment 6

The composition of any of Embodiments 1 to 5, wherein the first polycarbonate has an MVR of 10 to 200 cm³/10 min.

Embodiment 7

The composition of any of Embodiments 1 to 6, wherein the first polycarbonate has a branching level of greater than or equal to 3%.

Embodiment 8

The composition of any of Embodiments 1 or 3 to 7, wherein the flame-retardant comprises a potassium perfluorobutane sulfonate salt greater in an amount greater than about 0.04 wt. % based upon the total weight of polycarbonate resin in the composition.

Embodiment 9

The composition of any of Embodiments 1 to 8, wherein the flame-retardant excludes a chlorine or bromine containing composition.

Embodiment 10

The composition of any of Embodiments 1 to 9, wherein the branching agent comprises THPE, TMTC, isatin-bisphenol, or combinations thereof.

Embodiment 11

The composition of any of Embodiments 1 to 10, wherein the first polycarbonate has a weight-average molecular weight of 20,000 g/mole to 40,000 g/mole as measured by gel permeation chromatography using polycarbonate standards.

Embodiment 12

The composition of any of Embodiments 1 to 11, wherein the first polycarbonate is a homopolycarbonate derived from a bisphenol A.

Embodiment 13

The composition of any of Embodiment 1 to 12, wherein the first polycarbonate is a copolycarbonate derived from more than one bisphenol.

Embodiment 14

The composition of any of Embodiments 1 to 13, wherein the second polycarbonate comprises units derived from bisphenol A and PPPBP.

Embodiment 15

The composition of any of Embodiments 14, wherein the structural units derived from PPPBP are present in an amount of 20-40 mol %, based on the total moles of structural units.

Embodiment 16

The composition of any of Embodiments 1 to 15, wherein the composition has a haze value of less than 1.5% at 3.2 mm thickness as determined by ASTM D1003.

Embodiment 17

The composition of any of Embodiments 1 to 16, further comprising one or more additives.

Embodiment 18

The composition of Embodiment 17, wherein the additives comprise UV stabilizing additives, thermal stabilizing additives, mold release agents, colorants, organic fillers, inorganic fillers, gamma-stabilizing agents, or combinations thereof.

Embodiment 19

The composition of any of Embodiment 1 to 18, wherein the composition is free of fluorine.

Embodiment 20

The composition of any of Embodiments 1 to 19, having a transmission value greater than or equal to 85% at 3.2 mm thickness as determined by ASTM D1003.

Embodiment 21

An article comprising the composition of any of Embodiments 1 to 20.

Embodiment 22

A composition comprising potassium perfluorobutane sulfonate; 15 to 50 weight percent of a first polycarbonate, wherein the first polycarbonate comprises structural units of formula (I)

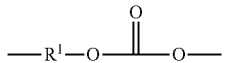

wherein at least 60 percent of the total number of $R^1$ groups comprise aromatic groups and the balance thereof are aliphatic or alicyclic groups, and terminal groups derived from an end-capping agent, wherein the first polycarbonate has a branching level of greater than or equal to 2%, a weight average molecular weight of 20,000 to 55,000 g/mol as measured by gel permeation chromatography using polycarbonate standards, and a peak melt viscosity greater than or equal to 25,000 poise when measured using a parallel plate melt rheology test at a heating rate of 10 degrees C./minute at a temperature of 350 to 450 degree C. at a frequency of 3 radians/second and a strain amplitude of 9%; 20 to 50 weight percent of a second polycarbonate having a glass transition temperature greater than or equal to 170° C., wherein the second polycarbonate comprises structural units derived from HO-$A^1$-$Y^1$-$A^2$-OH and structural units derived from HO-$A^1$-$Y^2$-$A^2$-OH wherein each of $A^1$ and $A^2$ is a monocyclic divalent aryl group, $Y^1$ is an aliphatic bridging group or bridging group comprising one to three atoms with the proviso that at least one of the atoms is a hetero atom, and $Y^2$ is an aromatic group having 6 to 30 carbon atoms, and 15 to 50 weight percent of a third polycarbonate comprising structural units derived from bisphenol A and having a branching level of 0 to less than 2%, and a molecular weight of 17,000 to 40,000 g/mol as measured by gel permeation chromatography using polycarbonate standards wherein weight percent is based on the combined weight of the first, second and third polycarbonates and the composition has a heat distortion temperature greater than or equal to 145° C., ductility greater than or equal to 90% at 23° C., multi-axial impact greater than or equal to 50 J/m at 23° C., and a molded article of the composition has a UL 94 V0 rating at a thickness of 1.0 mm.

Embodiment 23

A composition comprising potassium sulfone sulfonate; 15 to 50 weight percent of a first polycarbonate, wherein the first polycarbonate comprises structural units of formula (I)

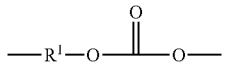

wherein at least 60 percent of the total number of $R^1$ groups comprise aromatic groups and the balance thereof are aliphatic or alicyclic groups, and terminal groups derived from an end-capping agent, wherein the first polycarbonate has a branching level of greater than or equal to 2%, a weight average molecular weight of 20,000 to 55,000 g/mol as measured by gel permeation chromatography using polycarbonate standards, and a peak melt viscosity greater than or equal to 25,000 poise when measured using a parallel plate melt rheology test at a heating rate of 10 degrees C./minute at a temperature of 350 to 450 degree C. at a frequency of 3 radians/second and a strain amplitude of 9%; 20 to 50 weight percent of a second polycarbonate having a glass transition temperature greater than or equal to 170° C., wherein the second polycarbonate comprises structural units derived from HO-$A^1$-$Y^1$-$A^2$-OH and structural units derived from HO-$A^1$-$Y^2$-$A^2$-OH wherein each of $A^1$ and $A^2$ is a monocyclic divalent aryl group, $Y^1$ is an aliphatic bridging group or bridging group comprising one to three atoms with the proviso that at least one of the atoms is a hetero atom, and $Y^2$ is an aromatic group having 6 to 30 carbon atoms, and 15 to 50 weight percent of a third polycarbonate comprising structural units derived from bisphenol A and having a branching level of 0 to less than 2%, and a molecular weight of 17,000 to 40,000 g/mol as measured by gel permeation chromatography using polycarbonate standards, wherein weight percent is based on the combined weight of the first, second and third polycarbonates and the composition has a heat distortion temperature greater than or equal to 145° C., ductility greater than or equal to 90% at 23 degrees C., multi-axial impact greater than or equal to 50 J/m at 23° C., and a molded article of the composition has a UL 94 V0 rating at a thickness of 1.2 mm.

Embodiment 24

A composition comprising: potassium perfluorobutane sulfonate; 15 to 50 weight percent of a first polycarbonate, wherein the first polycarbonate comprises structural units of derived from bisphenol A, wherein the first polycarbonate has a branching level of greater than or equal to 2%, a weight average molecular weight of 20,000 to 55,000 g/mol as measured by gel permeation chromatography using polycarbonate standards, and a peak melt viscosity greater than or equal to 25,000 poise when measured using a parallel plate melt rheology test at a heating rate of 10 degrees C./minute at a temperature of 350 to 450 degree C. at a frequency of 3 radians/second and a strain amplitude of 9%; 20 to 50 weight percent of a second polycarbonate having a glass transition temperature greater than or equal to 170° C., wherein the second polycarbonate comprises structural units derived from bisphenol A and PPPBP and the structural units derived from PPPBP are present in an amount of 20-40 mol % based on the total number of moles of structural units, and 15 to 50 weight percent of a third polycarbonate comprising structural units derived from bisphenol A and having a branching level of 0 to less than 2%, and a molecular weight of 17,000 to 40,000 g/mol as measured by gel permeation chromatography using polycarbonate standards wherein weight percent is based on the combined weight of the first, second and third polycarbonates and the composition has a heat distortion temperature greater than or equal to 145° C., ductility greater than or equal to 90% at 23° C., multi-axial impact greater than or equal to 50 J/m at 23° C., and a molded article of the composition has a UL 94 V0 rating at a thickness of 1.0 mm.

Embodiment 25

A composition comprising potassium sulfone sulfonate; 15 to 50 weight percent of a first polycarbonate, wherein the first polycarbonate comprises structural units of derived from bisphenol A, wherein the first polycarbonate has a branching level of greater than or equal to 2%, a weight average molecular weight of 20,000 to 55,000 g/mol as measured by gel permeation chromatography using polycarbonate standards, and a peak melt viscosity greater than or equal to 25,000 poise when measured using a parallel plate melt rheology test at a heating rate of 10 degrees C./minute at a temperature of 350 to 450 degree C. at a frequency of 3 radians/second and a strain amplitude of 9%; 20 to 50 weight percent of a second polycarbonate having a glass transition temperature greater than or equal to 170° C., wherein the second polycarbonate comprises structural units derived from bisphenol A and PPPBP and the structural units derived from PPPBP are present in an amount of 20-40 mol % based on the total number of moles of structural units, and 15 to 50 weight percent of a third polycarbonate comprising structural units derived from bisphenol A and having a branching level of 0 to less than 2%, and a molecular weight of 17,000 to 40,000 g/mol as measured by gel permeation chromatography using polycarbonate standards wherein weight percent is based on the combined weight of the first, second and third polycarbonates and the composition has a heat distortion temperature greater than or equal to 145° C., ductility greater than or equal to 90% at 23° C., multi-axial impact greater than or equal to 50 J/m at 23° C., and a molded article of the composition has a UL 94 V0 rating at a thickness of 1.2 mm.

While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A composition comprising:
a flame retardant comprising a sulfonate salt;
15 to 50 weight percent of a first polycarbonate, wherein the first polycarbonate comprises structural units of formula (I)

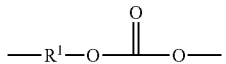

wherein at least 60 percent of the total number of $R^1$ groups comprise aromatic groups and the balance thereof are aliphatic or alicyclic groups, and terminal groups derived from an end-capping agent, wherein the first polycarbonate has a branching level of greater than or equal to 2%, a weight average molecular weight of 20,000 to 55,000 g/mol as measured by gel permeation chromatography using polycarbonate standards, and a peak melt viscosity greater than or equal to 25,000 poise when measured using a parallel plate melt rheology test at a heating rate of 10 degrees C./minute at a temperature of 350 to 450° C. at a frequency of 3 radians/second and a strain amplitude of 9%;
20 to 50 weight percent of a second polycarbonate having a glass transition temperature greater than or equal to 170° C., wherein the second polycarbonate comprises structural units derived from HO-$A^1$-$Y^1$-$A^2$-OH and structural units derived from HO-$A^1$-$Y^2$-$A^2$-OH wherein each of $A^1$ and $A^2$ is a monocyclic divalent aryl group, $Y^1$ is an aliphatic bridging group or bridging group comprising one to three atoms with the proviso that at least one of the atoms is a hetero atom, and $Y^2$ is an aromatic group having 6 to 30 carbon atoms, and
15 to 50 weight percent of a third polycarbonate comprising structural units derived from bisphenol A and having a branching level of 0 to less than 2%, and a molecular weight of 17,000 to 40,000 g/mol as measured by gel permeation chromatography using polycarbonate standards,
wherein weight percent is based on the combined weight of the first, second and third polycarbonates and the composition has a heat distortion temperature greater than or equal to 145° C., a ductility greater than or equal to 90% at 23 degrees C., a multi-axial impact greater than or equal to 50 J/m at 23° C., and a molded article of the composition has a UL 94 V0 rating at a thickness of 1.5 mm; and
wherein the branching levels are determined by dividing a number of moles of branching agent by a total moles of bisphenol from which the respective polycarbonate is derived times 100.

2. The composition of claim 1, wherein the flame retardant comprises potassium perfluorobutane sulfonate.

3. The composition of claim 1, wherein the end-capping agent comprises phenol or a phenol containing one or more substitutions comprising aliphatic groups, olefinic groups, aromatic groups, halogens, ester groups, ether groups, halogens, cyano groups, or combinations thereof.

4. The composition of claim 3, wherein the end-capping agent consists essentially of phenol, p-t-butylphenol, p-cumylphenol, or combinations thereof.

5. The composition of claim 1, wherein the end-capping agent has a pKa of 8.3 to 11.

6. The composition of claim 1, wherein the first polycarbonate has an MVR of 10 to 200 cm$^3$/10 min.

7. The composition of claim 1, wherein the branching level of the first polycarbonate is greater than or equal to 3%.

8. The composition of claim 1, wherein the flame-retardant comprises a potassium perfluorobutane sulfonate salt greater in an amount greater than about 0.04 wt. % based upon the total weight of polycarbonate resin in the composition.

9. The composition of claim 1, wherein the flame-retardant excludes a chlorine or bromine containing composition.

10. The composition of claim 1, wherein the branching agent comprises tris-p-hydroxy phenyl ethane, trimellitic trichloride, isatin-bis-phenol, or combinations thereof.

11. The composition of claim 1, wherein the weight-average molecular weight of the first polycarbonate has is 20,000 g/mole to 40,000 g/mole as measured by gel permeation chromatography using polycarbonate standards.

12. The composition of claim 1, wherein the first polycarbonate is a homopolycarbonate derived from a bisphenol A or a copolycarbonate derived from more than one bisphenol.

13. The composition of claim 1, wherein the second polycarbonate comprises units derived from bisphenol A and 3,3-bis(4-hydroxyphenyl)-2-phenylisoindolin-1-one.

14. The composition of claim 13, wherein the structural units derived from 3,3-bis(4-hydroxyphenyl)-2-phenylisoindolin-1-one are present in an amount of 20-40 mol %, based on the total moles of structural units.

15. The composition of claim 1, wherein the composition has a haze value of less than 1.5% at 3.2 mm thickness as determined by ASTM D1003.

16. The composition of claim 1, further comprising one or more additives.

17. The composition of claim 16, wherein the additives comprise UV stabilizing additives, thermal stabilizing additives, mold release agents, colorants, organic fillers, inorganic fillers, gamma-stabilizing agents, or combinations thereof.

18. The composition of claim 1, wherein the composition is free of fluorine.

19. The composition of claim 1, having a transmission value greater than or equal to 85% at 3.2 mm thickness as determined by ASTM D1003.

20. An article comprising the composition of claim 1.

21. A composition comprising:

potassium perfluorobutane sulfonate;

15 to 50 weight percent of a first polycarbonate, wherein the first polycarbonate comprises structural units of formula (I)

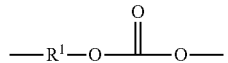

wherein at least 60 percent of the total number of $R^1$ groups comprise aromatic groups and the balance thereof are aliphatic or alicyclic groups, and terminal groups derived from an end-capping agent, wherein the first polycarbonate has a branching level of greater than or equal to 3%, a weight average molecular weight of 20,000 to 55,000 g/mol as measured by gel permeation chromatography using polycarbonate standards, and a peak melt viscosity greater than or equal to 25,000 poise when measured using a parallel plate melt rheology test at a heating rate of 10 degrees C./minute at a temperature of 350 to 450 degree C. at a frequency of 3 radians/second and a strain amplitude of 9%;

20 to 50 weight percent of a second polycarbonate having a glass transition temperature greater than or equal to 170° C., wherein the second polycarbonate comprises structural units derived from HO-$A^1$-$Y^1$-$A^2$-OH and structural units derived from HO-$A^1$-$Y^2$-$A^2$-OH wherein each of $A^1$ and $A^2$ is a monocyclic divalent aryl group, $Y^1$ is an aliphatic bridging group or bridging group comprising one to three atoms with the proviso that at least one of the atoms is a hetero atom, and $Y^2$ is an aromatic group having 6 to 30 carbon atoms, and 15 to 50 weight percent of a third polycarbonate comprising structural units derived from bisphenol A and having a branching level of 0 to less than 2%, and a molecular weight of 17,000 to 40,000 g/mol as measured by gel permeation chromatography using polycarbonate standards wherein weight percent is based on the combined weight of the first, second and third polycarbonates and the composition has a heat distortion temperature greater than or equal to 145° C., a ductility greater than or equal to 90% at 23° C., a multi-axial impact greater than or equal to 50 J/m at 23° C., and a molded article of the composition has a UL 94 V0 rating at a thickness of 1.0 mm; and wherein the branching levels are determined by dividing a number of moles of branching agent by a total moles of bisphenol from which the respective polycarbonate is derived times 100.

22. A composition comprising:

potassium sulfone sulfonate;

15 to 50 weight percent of a first polycarbonate, wherein the first polycarbonate comprises structural units of formula (I)

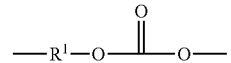

wherein at least 60 percent of the total number of $R^1$ groups comprise aromatic groups and the balance thereof are aliphatic or alicyclic groups, and terminal groups derived from an end-capping agent, wherein the first polycarbonate has a branching level of greater than or equal to 2%, a weight average molecular weight of 20,000 to 55,000 g/mol as measured by gel permeation chromatography using polycarbonate standards, and a peak melt viscosity greater than or equal to 25,000 poise when measured using a parallel plate melt rheology test at a heating rate of 10 degrees C./minute at a temperature of 350 to 450 degree C. at a frequency of 3 radians/second and a strain amplitude of 9%;

20 to 50 weight percent of a second polycarbonate having a glass transition temperature greater than or equal to 170° C., wherein the second polycarbonate comprises structural units derived from HO-$A^1$-$Y^1$-$A^2$-OH and structural units derived from HO-$A^1$-$Y^2$-$A^2$-OH wherein each of $A^1$ and $A^2$ is a monocyclic divalent aryl group, $Y^1$ is an aliphatic bridging group or bridging group comprising one to three atoms with the proviso that at least one of the atoms is a hetero atom, and $Y^2$ is an aromatic group having 6 to 30 carbon atoms, and 15 to 50 weight percent of a third polycarbonate comprising structural units derived from bisphenol A and having a branching level of 0 to less than 2%, and a molecular weight of 17,000 to 40,000 g/mol as measured by gel permeation chromatography using polycarbonate standards, wherein weight percent is based on the combined weight of the first, second and third polycarbonates and the composition has a heat distortion temperature greater than or equal to 145° C., a ductility greater than or equal to 90% at 23 degrees C., a multi-axial impact greater than or equal to 50 J/m at 23° C., and a molded article of the composition has a UL 94 V0 rating at a thickness of 1.2 mm; and wherein the branching levels are determined by dividing a number of moles of branching agent by a total moles of bisphenol from which the respective polycarbonate is derived times 100.

23. A composition comprising:

potassium perfluorobutane sulfonate;

15 to 50 weight percent of a first polycarbonate, wherein the first polycarbonate comprises structural units of derived from bisphenol A, wherein the first polycarbonate has a branching level of greater than or equal to 2%, a weight average molecular weight of 20,000 to 55,000 g/mol as measured by gel permeation chromatography using polycarbonate standards, and a peak melt viscosity greater than or equal to 25,000 poise when measured using a parallel plate melt rheology test at a heating rate of 10 degrees C./minute at a temperature of 350 to 450 degree C. at a frequency of 3 radians/second and a strain amplitude of 9%;

20 to 50 weight percent of a second polycarbonate having a glass transition temperature greater than or equal to 170° C., wherein the second polycarbonate comprises structural units derived from bisphenol A and 3,3-bis (4-hydroxyphenyl)-2-phenylisoindolin-1-one and the structural units derived from 3,3-bis(4-hydroxyphenyl)-2-phenylisoindolin-1-one are present in an amount of 20-40 mol % based on the total number of moles of structural units, and 15 to 50 weight percent of a third polycarbonate comprising structural units derived from bisphenol A and having a branching level of 0 to less than 2%, and a molecular weight of 17,000 to 40,000 g/mol as measured by gel permeation chromatography using polycarbonate standards wherein weight percent is based on the combined weight of the first, second and third polycarbonates and the composition has a heat distortion temperature greater than or equal to 145° C., a ductility greater than or equal to 90% at 23° C., a multi-axial impact greater than or equal to 50 J/m at 23° C., and a molded article of the composition has a UL 94 V0 rating at a thickness of 1.0 mm; and wherein the branching levels are determined by dividing a number of moles of branching agent by a total moles of bisphenol from which the respective polycarbonate is derived times 100.

24. A composition comprising:

potassium sulfone sulfonate;

15 to 50 weight percent of a first polycarbonate, wherein the first polycarbonate comprises structural units of derived from bisphenol A, wherein the first polycarbonate has a branching level of greater than or equal to 2%, a weight average molecular weight of 20,000 to 55,000 g/mol as measured by gel permeation chromatography using polycarbonate standards, and a peak melt viscosity greater than or equal to 25,000 poise when measured using a parallel plate melt rheology test at a heating rate of 10 degrees C./minute at a temperature of 350 to 450 degree C. at a frequency of 3 radians/second and a strain amplitude of 9%;

20 to 50 weight percent of a second polycarbonate having a glass transition temperature greater than or equal to 170° C., wherein the second polycarbonate comprises structural units derived from bisphenol A and 3,3-bis (4-hydroxyphenyl)-2-phenylisoindolin-1-one and the structural units derived from 3,3-bis(4-hydroxyphenyl)-2-phenylisoindolin-1-one are present in an amount of 20-40 mol % based on the total number of moles of structural units, and 15 to 50 weight percent of a third polycarbonate comprising structural units derived from bisphenol A and having a branching level of 0 to less than 2%, and a molecular weight of 17,000 to 40,000 g/mol as measured by gel permeation chromatography using polycarbonate standards;

wherein weight percent is based on the combined weight of the first, second and third polycarbonates and the composition has a heat distortion temperature greater than or equal to 145° C., a ductility greater than or equal to 90% at 23° C., a multi-axial impact greater than or equal to 50 Jim at 23° C., and a molded article of the composition has a UL 94 V0 rating at a thickness of 1.2 mm; and wherein the branching levels are determined by dividing a number of moles of branching agent by a total moles of bisphenol from which the respective polycarbonate is derived times 100.

25. The composition of claim 1, wherein the composition comprises 25 to 45 weight percent of the first polycarbonate, 20 to 40 weight percent of the second polycarbonate, and 20 to 35 weight percent of the third polycarbonate.

* * * * *